(12) United States Patent
Aurand et al.

(10) Patent No.: US 10,928,366 B2
(45) Date of Patent: *Feb. 23, 2021

(54) COMPOSITIONS AND METHODS FOR COMBINING PROTEIN PRECIPITATION AND SOLID PHASE EXTRACTION

(75) Inventors: Craig Aurand, Lock Haven, PA (US); Charles Mi, State College, PA (US); Paul Ross, Bellefonte, PA (US); An Trinh, State College, PA (US); Hillel Brandes, State College, PA (US); Michael Ye, State College, PA (US)

(73) Assignee: Sigma-Aldrich Co. LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/019,445

(22) Filed: Jan. 24, 2008

(65) Prior Publication Data

US 2008/0213906 A1  Sep. 4, 2008

Related U.S. Application Data

(60) Provisional application No. 60/886,697, filed on Jan. 26, 2007.

(51) Int. Cl.

| G01N 33/84 | (2006.01) |
|---|---|
| G01N 30/60 | (2006.01) |
| B01J 20/10 | (2006.01) |
| B01J 20/06 | (2006.01) |
| B01J 20/32 | (2006.01) |
| G01N 33/00 | (2006.01) |

(52) U.S. Cl.
CPC .......... *G01N 30/6091* (2013.01); *B01J 20/06* (2013.01); *B01J 20/103* (2013.01); *B01J 20/3204* (2013.01); *B01J 20/3208* (2013.01); *B01J 20/3236* (2013.01)

(58) Field of Classification Search
CPC ...... B01J 20/06; B01J 20/103; B01J 20/3236; B01J 20/32; G01N 30/6091
USPC ........ 436/63, 178; 210/502.1; 422/547, 68.1
See application file for complete search history.

(56) References Cited

U.S. PATENT DOCUMENTS

| 5,919,909 | A | 7/1999 | Josic et al. |
|---|---|---|---|
| 6,248,911 | B1 | 6/2001 | Canessa et al. |
| 6,254,780 | B1 | 7/2001 | Bouvier et al. |
| 6,350,383 | B1 | 2/2002 | Douglas |
| 6,524,487 | B2 | 2/2003 | Kulperger et al. |
| 6,974,702 | B2 | 12/2005 | Dasseux et al. |
| 7,074,327 | B2 | 7/2006 | O'Connor et al. |

(Continued)

FOREIGN PATENT DOCUMENTS

WO  2007090081 A2  8/2007

OTHER PUBLICATIONS

ISR regarding PCT/US2007/061214 dated Sep. 11, 2007.

(Continued)

*Primary Examiner* — Rebecca M Fritchman
(74) *Attorney, Agent, or Firm* — Sigma-Aldrich Co. LLC

(57) ABSTRACT

A composition, method and device for the preparation of biological samples for subsequent LC-MS analysis using a combined and concurrent protein precipitation and solid phase extraction (SPE) process is described. Through an integrated combination of protein precipitation, filtration, and SPE using a novel zirconia-coated chromatographic media, interfering compounds, such as proteins and phosphate-containing compounds, are eliminated from the biological samples, affording a higher degree of analyte response during LC-MS analysis.

12 Claims, 26 Drawing Sheets

(56) References Cited

U.S. PATENT DOCUMENTS

| | | |
|---|---|---|
| 7,256,049 B2* | 8/2007 | Bennett et al. .................. 436/71 |
| 7,402,243 B2* | 7/2008 | Liu et al. .................... 210/198.2 |
| 8,193,123 B2* | 6/2012 | Rank et al. ...................... 506/43 |
| 2002/0168775 A1 | 11/2002 | Gao |
| 2003/0010722 A1 | 1/2003 | Mills |
| 2004/0026324 A1* | 2/2004 | Luca ............................. 210/660 |
| 2004/0126890 A1 | 7/2004 | Gjerde et al. |
| 2004/0195182 A1* | 10/2004 | Elliott ........................... 210/681 |
| 2004/0226884 A1 | 11/2004 | O'Connor et al. |
| 2005/0118599 A1 | 6/2005 | Pawliszyn |
| 2005/0153297 A1 | 7/2005 | Ahmad et al. |
| 2006/0216206 A1* | 9/2006 | Hudson et al. ............... 422/100 |
| 2009/0062234 A1* | 3/2009 | Wilson .................. C08G 77/50 514/63 |

OTHER PUBLICATIONS

Maurer, "Advances in analytical toxicology: the current role of liquid chromatography-mass spectrometry in drug quantification in blood and oral fluid", Anal Bioanal Chem, 2005, pp. 110-118, vol. 381.

Patel, et al, "Determination of total mycophenolic acid and its glucuronide metabolite using liquid chromatography with ultraviolet detection and unbound mycophenolic acid using tandem mass spectrometry", Journal of Chromatography B, 2004, pp. 287-294, vol. 813.

Office Action for U.S. Appl. No. 12/785,160; dated Apr. 1, 2013 (16 pages).

U.S. Appl. No. 12/785,160 Office Action dated Jan. 13, 2014 (10 pages).

* cited by examiner

COMPOSITIONS AND METHODS FOR COMBINING PROTEIN PRECIPITATION AND SOLID PHASE EXTRACTION

CROSS REFERENCE TO RELATED APPLICATIONS

This application claims priority from U.S. Provisional Application Ser. No. 60/886,697 filed on Jan. 26, 2007, which is hereby incorporated by reference in its entirety.

FIELD OF THE INVENTION

The present invention relates generally to a solid phase extraction particle. Further, the present invention relates to protein precipitation and solid phase extraction techniques of sample preparation for the removal of proteins and phosphate-containing compounds.

BACKGROUND OF THE INVENTION

In pharmaceutical bioanalysis, researchers develop and run various assays to quantitate drugs, pharmaceutical candidates, and their metabolites in biological fluids, such as serum and plasma. The data resulting from these assays are used to help determine the pharmacodynamic and pharmacokinetic properties as well as the toxic and therapeutic concentrations of existing and emerging pharmaceutical compounds in living cells, tissues, and animals. Bioanalytical evaluation is a critical element of the analytical information utilized during the course of drug development, including the pre-clinical stage, the clinical stage, and the therapeutic drug monitoring stage.

With recent advances in combinatorial chemistry, genomics, and proteomics, the enhanced knowledge of drug mechanisms increasingly results in drug designs structurally catered to endogenous biomolecules. Such drugs are typically far more potent, requiring smaller dosages for full efficacy, and correspondingly smaller concentrations of the drugs and their metabolites appear in biological fluids. Although advances in Liquid Chromatography-Mass Spectrometry (LC-MS) technology have reaped overwhelming benefits in terms of increased throughput and sensitivity, good sample preparation continues to be a critical component of bioanalysis.

Most sample preparation techniques have three important purposes: 1) concentration of analyte or analytes of interest; 2) removal of endogenous interferences or interfering compositions inherent with the original sample; and, 3) switching sample matrices to a sample environment more compatible with the analytical system. Most bioanalytical scientists have a number of sample preparation techniques available to them, ranging from simple dilution to more elaborate techniques, such as dialysis, ultrafiltration, supercritical fluid extraction, liquid-liquid extraction, and monolithic chromatography. Among the most predominant techniques in bioanalytical labs are protein precipitation, liquid-liquid extraction (LLE), and solid phase extraction (SPE).

In protein precipitation, biological samples (e.g. plasma) are diluted with a protein precipitating reagent, such as acetonitrile, typically at a volume ratio between 1:3 and 1:4. The diluted sample is vortexed, and the resulting precipitated proteins are removed using filtration or centrifugation methods. The filtrate or supernate is analyzed without further processing by LC-MS or LC-MS-MS systems. LC-MS-MS, or liquid chromatography-mass spectrometry-mass spectrometry, is an analytical technique in which an additional mass spectrometry is performed on a fragmented ion selected from the first mass spectrometry, and is most often used to sequence peptides. Protein precipitation is simple, fast, requires no development of methods specific for different types of bioanalytical samples, and is amenable to high throughput applications via automated or computer-directed liquid handlers using 96-well technology. However, there are some major drawbacks to the protein precipitation technique.

Because a precipitating agent is added to the sample in the form of a liquid solution, analytes are less concentrated after sample preparation than before, resulting in decreased sensitivity. The precipitated sample can be evaporated to dryness and reconstituted prior to analysis, but the high aqueous content from the original biological sample may make evaporation difficult and time consuming. In addition to the dilution effect, protein precipitation will only remove gross/macro levels of proteins from the original sample. Many other components of the sample besides proteins may potentially interfere with subsequent bioanalytical analysis in the supernate or filtrate. Such components can co-elute with analytes of interest during analytical chromatography and reduce efficiency of the ionization process during mass spectroscopy detection.

Liquid-liquid extraction (LLE) is another classic sample preparation technique in which an immiscible solvent is added to the biological sample and shaken and/or vortexed. After the immiscible layers are allowed to separate, the organic layer is often concentrated or evaporated and reconstituted prior to chromatographic analysis. The broad ranges of solvent polarities make this technique amenable to a wide range of applications, but as society becomes more environmentally conscious, the large quantity of solvents required have made this technique less favorable. Although this technique can be used in a high throughput setting via automation and 96-well technology, issues, such as phase emulsion, still arise. Further, the LLE technique typically contains numerous disjointed steps that can make this technique labor-intensive, costly, and inefficient.

In solid phase extraction (SPE), a sample may initially be pre-treated by adjusting the pH of the sample, diluting the sample, or clarifying the sample. The sample is then passed through a chromatographic media that has been pre-conditioned with one or more reagents. The chromatographic media is often packed in a polypropylene cartridge (syringe barrel) or 96-well platform affixed with a Luer tip. The packed bed of chromatographic media is often held in place between two opposed polyethylene frits (i.e. porous filters made of fine polyethylene fibers or granules). As the sample passes through the media, analytes of interest are retained while interfering components pass through the cartridge unrestrained and are discarded. In practice, it is rare for the SPE system to be solely specific for the analytes of interest during sample loading, and interfering components are often co-retained. To combat the interfering components, one or more wash steps are introduced subsequent to the loading of the sample into the SPE cartridge to selectively elute interfering components without eluting analytes of interest. After the wash steps, one or more elution steps are used to selectively elute the analytes of interest for subsequent analysis. The choice of SPE media, reagents and solvents used in the process are carefully determined on the basis of sample characteristics, and the goals of the sample preparation assay.

Although SPE technology continues to displace LLE technology as the preferred sample preparation technology, there remains a need for improved methods for selective sample preparation. In pharmaceutical bioanalysis, drug concentrations are often measured in the parts-per-trillion or parts-per-quadrillion range. As a result, analysts need to develop increasingly sensitive methods to extend the lower limits of quantitation. SPE's growing popularity may be attributed to the wide selection of SPE chromatographic media chemistries and hardware configurations that are commercially available. In effect, analysts can develop selective and reproducible extraction methods that offer high recovery, which is of paramount importance in pharmaceutical bioanalysis. Other advantages of SPE technology include lower consumption of solvents, and adaptability to 96-well technology and robotic liquid handlers.

Even with the clear technological advantages of SPE, many analysts have reservations about using the technology. For example, the cost per sample increases when using SPE technology in bioanalysis, and many SPE procedures require multiple steps, resulting in increased assay time requirements. One of the most common disadvantages is a wide perception among researchers that SPE is overly complex and difficult to understand. As a result, researchers have difficulty grasping the chemistry and chromatographic principles behind the technique. The wide selection of phase chemistries and potential reagents and solvents used for each step makes method development and troubleshooting a daunting and time-consuming task. Taken together, the costs and complexity of SPE technology make it difficult for many researchers to develop robust SPE methods that meet their analytical objectives. A simple, low-cost, and robust SPE sample preparation method would lead to much more widespread utilization of this highly effective sample preparation technique.

One of the biggest advances in bioanalytical technology is the mainstream utilization of mass spectrometry detection coupled to High Performance Liquid Chromatography (HPLC) technology that is the foundation of LC-MS. As researchers switch from Liquid Chromatography-Ultraviolet detection (LC-UV) to LC-MS technology, detection sensitivity and selectivity have increased by several orders of magnitude. LC-MS technology also allows for shorter average run times of about 3-8 minutes per sample as compared to about 15-30 minutes observed in LC-UV. Excessive background from endogenous matrix components has always been a concern in quantitative bioanalysis, and is more paramount with decreasing analytical run times. In bioanalytical mass spectrometry, the issue of excessive background contributes to the growing problem of ion-suppression.

Ion-suppression is caused by one or more interfering components or species that co-elute with the analyte(s) of interest during LC-MS analysis and manifests itself as a loss of analyte response. These co-eluting species can affect droplet formation or ionize concurrently resulting in an erroneous decrease (suppression) or increase (enhancement) in signal response. Ion-suppression often leads to poor assay reproducibility, accuracy, and sensitivity, and such deleterious effects are often most notable at the Lower Limits of Quantitation (LLOQ).

One of the major causes of ion-suppression in bioanalysis is the presence of phospholipids during LC-MS or LC-MS-MS analysis in the positive ion electrospray mode (+ESI). Phospholipids are the second largest lipid component in biological matrices after triglycerides, and are typically present in extremely high concentrations in bioanalytical samples. Phospholipids potentially interact with analytes during MS and inhibit the detection of some analytes.

Phospholipid concentrations may vary significantly between individuals, between different times of day, and between different sample types. Phosphatidylcholine, commonly known as 'lecithin', is the most abundant phospholipid in vertebrate plasma, where it is an integral component of the lipoproteins, and amounts to as much as 50% of the total phospholipid content. Phosphatidylethonalmine, or cephalin, the second most abundant phospholipid, is a major lipid component of microbial membranes. Phosphatidylinositol, especially abundant in brain tissue, is abundant in many organ types including the liver, and may amount to 10% of the phospholipids in a bioanalytical sample. Phosphatidylserine is the only phospholipid containing amino acids, but generally represents less than 10% of the total phospholipids in animal systems. While all phospholipids induce ion-suppression to some degree during LC-MS analysis, the ion-suppression caused by phosphatidylcholine is most prevalent, due to the lower endogenous concentrations of the other phospholipids in typical biological samples.

Existing common bioanalytical sample preparation techniques do not offer the necessary selectivity, and are relatively ineffective at separating phospholipids from analytes of interest prior to LC-MS analysis. Protein precipitation is often chosen for its innate simplicity and generic methodology, but this method only removes gross levels of interfering proteins from biological matrices, and does nothing to remove the phospholipids responsible for significant levels of ion-suppression. As a result, ion-suppression occurs to a higher degree during the analysis of biological samples prepared using protein precipitation methods exclusively, compared to other common sample preparation techniques.

Solid phase extraction (SPE) is much more selective than protein precipitation, and ion-suppression in biological samples prepared using SPE is often reduced significantly relative to biological samples prepared using protein precipitation. Three predominant modes of chromatography are used in bioanalytical SPE: reversed-phase mode that relies on hydrophobic interaction, ion-exchange mode that utilizes electrostatic interaction, and a combination of reversed-phase and ion-exchange modes. SPE phase chemistries are normally silica-based or polymer-based and are bonded to a functional group designed to chromatographically retain or release (elute) an analyte or analytes of interest and matrix components as determined by its mobile phase environment. The selectivity of existing SPE sample preparation methods for phospholipids remains limited. As a result, the accuracy and precision of pharmaceutical bioanalysis suffers when attempting to achieve desired lower limits of quantitation (LLOQ).

This shortcoming of existing SPE chromatographic media and polymeric resins is largely due to the chemical nature of phospholipids. The hydrophobic moiety of phospholipids interferes with the reversed-phase mode of existing SPE methodologies and the zwitterionic polar head group interferes with the ion-exchange mode of existing SPE methodologies. As a result, phospholipids are often co-retained and co-eluted with analytes of interest using existing SPE chromatographic media particles, to the detriment of the effectiveness and selectivity of SPE sample treatment methods.

Thus, there is a need for a new sample preparation platform that combines the strengths and benefits of protein precipitation and SPE, the two predominant techniques in bioanalytical sample preparation, yet eliminates the weaknesses of each respective technique. This sample preparation platform should be simple and generic, reflecting the benefits of protein precipitation, and should additionally offer the selectivity of a chromatographic SPE system that specifically targets the removal of phospholipids and/or any other species that can cause ion-suppression when analyzing biological matrices.

SUMMARY OF THE INVENTION

The present invention describes compositions, devices, and methods used to combine two common sample preparation practices used in pharmaceutical bioanalysis: protein precipitation and solid phase extraction (SPE). By combining the two techniques, the benefits of each technological platform are offered while minimizing their respective shortcomings. In general, the method combines the generic simplicity of protein precipitation with the selectivity benefits inherent with solid phase extraction. Unlike existing SPE methods that selectively retain the analyte of interest, followed by subsequent wash steps to induce the elution of the analyte, the SPE chromatographic media of the present invention retain or chemically filter out key endogenous sample interferences common in biological samples. These interfering molecules are particularly problematic in LC-MS analysis and often cause ion-suppression. Some of the major agents of ion-suppression in pharmaceutical bioanalysis include, but are not limited to, phospholipids and polyethylene glycol.

The present invention describes the composition of a novel SPE media used for the selective removal of interfering compounds, such as phosphate-containing compounds. In particular, a composition is developed that binds to phosphate compounds, to eliminate later ion-suppression. The SPE media include transition metal oxides, such as zirconia, titania, or ceria, bonded onto a substrate, such as porous silica. The porous silica can be used as a substrate of the SPE media because of its relatively high surface area.

There is also provided a method of bonding a transition metal oxide to a substrate, which results in a novel SPE media of the present invention. The initial process dries the substrate particles, such as porous silica particles, using known techniques, such as vacuum oven drying, azeotropic drying, or combinations thereof, and preferably the substrate is dried to a constant weight. The dried substrate particles are then combined with a transition metal alkoxide, such as zirconium isopropoxide, in solution with an anhydrous solvent, such as anhydrous toluene. The bonding reaction is halted, for example using hydrolysis in an acidic aqueous environment, and the remaining reactants and by-products are removed by known methods, such as solvent extraction. The resulting transition metal-coated SPE media is rinsed and dried.

The present invention further provides a method that incorporates protein precipitation followed by SPE using the novel SPE media with the method illustrated in the flowchart of FIG. 1. A biological sample, such as blood plasma or blood serum, is mixed with an organic acid, such as formic acid, that is in solution with a protein precipitating agent, such as acetonitrile. The resulting biological composition can then be contacted with the SPE media. The proteins that precipitate out of the resulting biological composition are removed from the biological composition by known techniques, such as centrifugation. The protein-free supernate resulting from the centrifugation of the biological composition is then contacted with the novel SPE media, such as zirconia-coated silica particles. Due to chemical interactions of the organic acid with the compounds in the biological composition and the SPE media, the novel SPE media preferentially binds to any phosphate-containing compounds in the biological composition. In addition, the organic acid in the biological composition likely interferes with any binding between the SPE media and any analytes in the biological composition, which includes pharmaceutical compounds, such as ketoprofin or propanolol. The eluate resulting from the contact of the biological composition with the SPE media of the present invention is essentially free of proteins and phosphate-containing compounds. The analytes remaining in the eluate may be quantified using bioanalytical measurements, such as LC-MS or LC-MS-MS.

Novel systems and devices used to selectively remove interfering components, such as proteins and phosphate-containing compounds, are also described. The device includes at least one cartridge in which the transition metal oxide SPE media is packed between two opposing filters, such as PTFE frits or polyethylene filters. The filters will likely have nominal porosities ranging between about 0.1 μm and about 50 μm. Each cartridge is an open-ended container known in the art, such as a polypropylene SPE cartridge. The cartridge can have various constructions with varying volumes, such as a SPE cartridge with a volume ranging between about 0.5 ml and about 60 ml, a syringe barrel with a volume between about 0.5 ml and about 60 ml, or a well with a headspace volume capacity ranging between about 0.5 ml and about 2 ml in a 96 well tray. The biological composition containing the biological sample mixed with the organic acid and protein precipitation agent is trickled through the system of the present invention without further treatment, or the supernate of centrifuged biological composition is trickled through the system of the present invention. In either case, the combined filters and SPE media act as physical and chemical filters to remove precipitated proteins, phosphate-containing compounds, such as phospholipids and other particulate matter from the biological composition, rendering the composition suitable for subsequent bioanalytical analysis using known techniques, such as LC-MS or LC-MS-MS.

The simplicity and robustness of the combined protein precipitation and SPE ample preparation compositions and methods described herein overcome many of the previous limitations of prior sample preparation techniques.

BRIEF DESCRIPTION OF THE DRAWINGS

FIG. 15A is an ion-trace of clonidine (m/z 230), FIG. 15B is an ion-trace of protryptiline (m/z 264), FIG. 15C is an ion-trace of clomipramine (m/z 315), FIG. 15D is an ion-trace of desmethyldiazepam (m/z 271), and FIG. 15E is an ion-trace of the phospholipids (m/z 184).

FIG. 28 is an LC-MS diagram of the phospholipids content (extracted ions from total ion chromatogram: m/z 184, 496, 784, 786, and 834) of a rat plasma sample treated using protein precipitation followed by filtration through a SPE cartridge loaded with SCX chromatographic media.

DETAILED DESCRIPTION OF THE INVENTION

Figure 1:
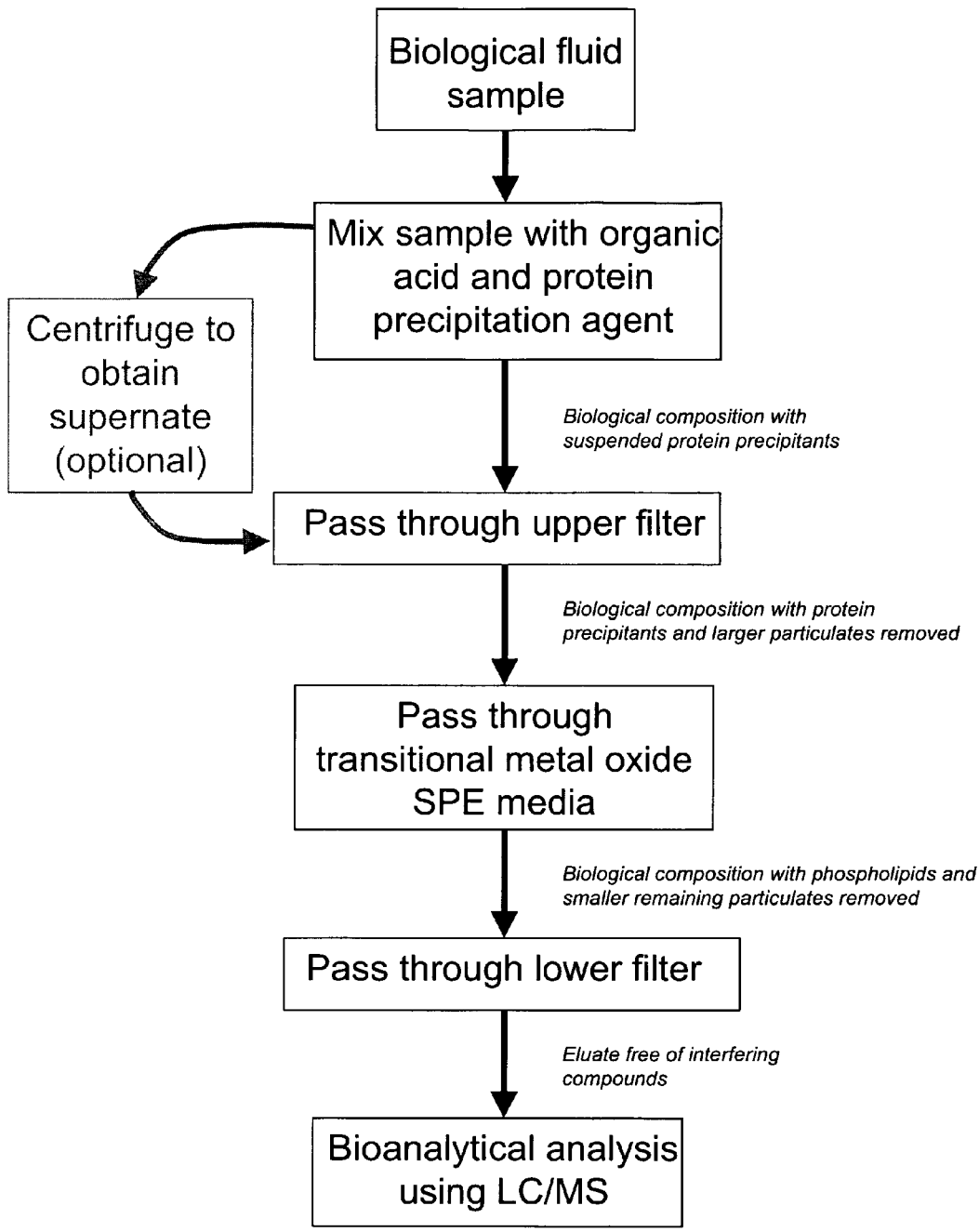
FIG. 1 is a flow chart of the method of the present invention.

The present invention describes a novel solid phase extraction (SPE) media used to selectively remove phosphate-containing compounds, such as phospholipids, from biological compositions, resulting in a biological composition that is suitable for bioanalytical analysis using measurement techniques, such as liquid chromatography-mass spectrometry (LC-MS) methods. SPE media that are particularly suited for the methods and devices of the invention are those capable of specifically interacting and binding the phosphate group of phospholipids.

The SPE media of the present invention includes a layer of transition metal oxide that is chemically bonded to a substrate. The substrate should possess chemical properties that allow for the covalent bonding of transition metal oxide compounds. The materials used for the substrate of the SPE media are selected from the group including porous silica, Immobilized Metal Affinity Chromatography (IMAC) materials, porous alumina, non-porous silica, non-porous alumina, carbon, zirconia, diatomaceous earth, controlled pore glass, and combinations thereof. Further, the media should have maximal surface area to maximize the capacity of the SPE media for the binding of phosphate-containing compounds during SPE. Particularly preferred substrate materials for the SPE media are particulate, porous materials, such as porous silica or porous alumina. The particle size of the substrate material ranges between about 10 nm and about 1000 μm, and more preferably between about 5 μm and about 70 μm. The preferred pore size of the substrate material ranges between about 30 Å and about 1000 Å, and more preferably between about 60 Å and about 400 Å. Overall, the preferred surface area of the substrate material ranges between about 5 m$^2$/g and about 1000 m$^2$/g, and more preferably between about 100 m$^2$/g and about 600 m$^2$/g.

Transition metal oxides, in the presence of low concentrations of organic acids, exhibit a particularly selective affinity for phosphate-containing compounds in biological compositions. Particularly preferred transition metal oxides for the SPE media of the present invention include zirconia, titania, ceria, and combinations thereof. The transition metal oxides are chemically bonded to the substrate, using a novel bonding method described below. Preferred SPE media resulting from this process include zirconia bonded to porous silica, titania bonded to porous silica, and ceria bonded to porous silica. The most preferred SPE media of the present invention is zirconia bonded to porous silica.

The present invention further describes a method of bonding a transition metal oxide to a substrate, yielding a solid phase extraction (SPE) media possessing a selective binding affinity for phosphate-containing compounds in aqueous solutions. Overall, the steps of the process include drying the substrate, combining the substrate with a transition metal alkoxide under anhydrous conditions, terminating the reaction, removing unused reactants and reaction by-products, and drying the resulting transition metal oxide bonded to the substrate.

As described above, the substrate used in the bonding method of the present invention should possess a high surface area and an affinity for binding to transition metal oxides. Preferred substrates are particles of material from the group including porous silica, porous alumina, non-porous silica, non-porous alumina, carbon, zirconia, diatomaceous earth, controlled pore glass, porous polymer, and combinations thereof. The most preferred substrate is a porous silica particle with a particle size ranging between about 5 µm and about 70 µm, a pore size ranging between about 60 Å and about 400 Å, and a surface area ranging between about 100 $m^2/g$ and about 600 $m^2/g$.

In the initial step of the bonding process of the present invention, the substrate is dried to constant weight using known techniques, such as room temperature drying, oven drying, vacuum oven drying, azeotropic drying, and combinations thereof. A more preferred method of drying is conducted in a vacuum oven at a temperature ranging between about 30° C. and about 300° C. The most preferred method of drying the substrate is drying in a vacuum oven at a temperature ranging between about 30° C. and about 300° C., followed by azeotropic drying using HPLC-grade toluene in a round bottom flask with a Dean Stark trap attached. During azeotropic drying, the substrate is added to the toluene in the round flask, the mixture is heated to a temperature ranging between about 100° C. and about 140° C., and then the flask is drained through the Dean Stark trap. This process of azeotropically drying the substrate is repeated up to five times.

The resulting dried particles are then combined with a transition metal alkoxide, defined herein as a transition metal bonded to three or more negatively charged oxygen atoms from the conjugate bases of alcohols. Transition metal alkoxides are typically used for coatings and as catalysts. Transition metal alkoxides used in the bonding method of the present invention include zirconia butoxide, zirconia ethoxide, zirconia isopropoxide, zirconia methoxide, titania butoxide, titania ethoxide, titania isopropoxide, titania methoxide, ceria butoxide, ceria ethoxide, ceria isopropoxide, ceria methoxide, and combinations thereof. Preferred transition metal alkoxides include zirconia butoxide, zirconia ethoxide, zirconia isopropoxide, and zirconia methoxide, and the most preferred transition metal alkoxide used in the bonding method of the present invention is zirconia isopropoxide.

The dried substrate is combined with the transition metal alkoxide under anhydrous conditions. The anhydrous conditions are particularly important because transition metal alkoxides are unstable in water, and tend to polymerize in aqueous solution, which significantly reduces the capacity of any resulting SPE media to bind to phosphate-containing compounds. The reaction mixture, consisting of the substrate and the transition metal alkoxide suspended in an anhydrous solvent, is heated to reflux to maintain anhydrous conditions and held at that temperature for a period ranging between about 4 and about 24 hours, and more preferably for a period ranging between about 8 hours and about 16 hours. Preferred molar ratios of transition metal oxide: substrate in the reaction mixture ranges between about 0.5 and about 3. During this time, the transition metal alkoxide reacts with the substrate, forming a transition metal oxide that is chemically bonded to the substrate.

Anhydrous solvents used for the reaction mixture include anhydrous toluene, 1,2-dichloroethane, 1-methyl-2-pyrrolidinone, acetonitrile, benzene, butyl ether, chloroform, dimethyl sulfoxide, ethyl acetate, heptane, isopropyl alcohol, methyl alcohol, methylene chloride, N,N-dimethylacetamide, N,N-dimethylformamide, p-dioxane, pentane, petroleum ether, pyridine, tetrahydrofuran, xylene, ethyl benzene, and combinations thereof. The most preferred anhydrous solvent is anhydrous toluene.

Once the bonding reaction has proceeded for a sufficient duration, the bonding reaction is terminated. A preferred method for reaction termination is by hydrolysis using an organic or inorganic acid in aqueous solution at a concentration of no more than about 10% and a temperature ranging between about 20° C. and about 100° C.

After the termination of the bonding reaction, any remaining solvents, excess reactants, and reaction by-products are separated from the SPE media that resulted from the bonding reaction. A preferred method of separating the remaining solvents, excess reactants, and reaction by-products from the SPE media is solvent extraction. A preferred filtration device used to filter the transition metal oxide-coated substrate out of the remaining liquid components of the reaction process is a sintered-glass Buchner funnel with a suitable pore size. A suitable pore size can range between about 10 µm and about 100 µm.

After separating the SPE media from the solvents, excess reactants and reaction by-products, the SPE media resulting from the bonding process of the present invention is dried to constant mass using known methods. A preferred method of drying uses a vacuum oven at a temperature ranging between about 20° C. and about 150° C., and more preferably ranging between about 50° C. and about 150° C.

A method for the selective removal of interfering components from a biological composition prior to bioanalytical analysis is also described in the present invention. This method is used to selectively remove dissolved compounds, such as proteins and phospholipids, from a biological fluid sample, thereby optimizing the composition of the sample for subsequent bioanalytical analysis using measurement techniques, such as LC-MS or LC-MS-MS. A flow chart of the method of the present invention is presented in FIG. 1. The present invention includes a method whereby a biological sample is combined with an organic acid in solution with a protein precipitating agent, thus forming a biological composition with precipitated proteins. The precipitated proteins are separated from the biological composition, and the biological composition is contacted with a transition metal oxide to separate any phosphate-containing compounds from the biological composition. This results in an eluate that is essentially free of compounds that may interfere with the detection of analytes in the biological composition using bioanalytical measurements, such as LC-MS.

The biological samples that are suitable for the biological sample preparation method of the present invention are any fluid samples collected from living or post-mortem eukaryotic organisms, including blood, urine, lymph, blood plasma, blood serum, bile fluid, cerebrospinal fluid, supernate from cell cultures, tissue extracts, and combinations thereof. Eukaryotic organisms are defined herein as any multicellular organism, including plants, animals, and fungi. Tissue samples may be centrifuged, desiccated and reconstituted, frozen and thawed, or otherwise treated using other known methods, prior to treatment using the method of the present invention.

The organic acid added to the biological sample interferes with the binding of desired analytes in the biological sample to the SPE media, thereby allowing the analytes to pass through the SPE media and emerge with the resulting eluate. Organic acids used in the sample preparation method of the present invention include formic acid, acetic acid, citric acid, oxalic acid, maleic acid, malic acid, pyromellitic acid, and combinations thereof. More preferably, formic acid is used in the method of the present invention.

The addition of the protein precipitation agent to the biological sample results in the precipitation of dissolved proteins, such as albumin, out of the biological sample. The protein precipitation agents are generally salts, organic solvents, acids, or bases that alter the solubility of proteins in an aqueous solution, thereby causing the proteins to precipitate out of solution. Precipitation agents used for the sample preparation method of the present invention include acetonitrile, formic acid, acetic acid, trichloroacetic acid, acetone, ethanol, hydrochloric acid, methanol, chloroform, ammonium sulfate, sodium citrate, sulfuric acid, polyethylene glycol, dextran, alginate, carboxymethycellulose, polyacrylic acid, tannic acid, polyphosphates, potassium chloride, ethanol, zinc chloride, t-butanol, and combinations thereof. More preferably, acetonitrile is used in this method.

The organic acid and protein precipitating agent are added to the biological sample as a solution containing the organic acid at a concentration of no more than about 5%, preferably between about 1% and about 2%, and most preferably about 1%, dissolved in the protein precipitating agent. The most preferred organic acid/protein precipitating agent solution is 1% formic acid in acetonitrile. The combined organic acid/ protein precipitating agent solution is added to the biological sample at a solution:sample volume ratio ranging between about 2:1 and about 5:1, and more preferably about 3:1.

Proteins that are precipitated by the protein precipitation agent in the biological composition are separated from the biological composition using known methods, such as filtration, centrifugation, and combinations thereof. The biological composition, in one embodiment, may be centrifuged, and the resulting supernate of the centrifuged biological composition may be contacted with the transition metal oxide. In another embodiment, the biological composition may be filtered, and the resulting filtrate may be contacted with the transition metal oxide.

The transition metal oxide, described above, may be contacted with the biological composition by any known method, but preferred methods involve placing the transition metal oxide into a container and trickling the biological composition through the transition metal oxide in the container. The container is selected from the group including SPE cartridges with volumes ranging between about 0.5 ml and about 60 ml, and more preferably a 1 ml SPE cartridge. In one embodiment, the transition metal oxide is packed into the SPE cartridge between an upper PTFE frit with a nominal porosity of 5 μm and a lower 0.2 μm porosity filter.

In practice, the biological composition, which includes the biological sample mixed with the organic acid/protein precipitation agent solution, is introduced into the top of the SPE filter, first contacting the upper frit, which filters out the precipitated proteins that are suspended in the biological composition. The filtrate of the biological composition next contacts the transition metal oxide, which preferentially binds any phosphate-containing compounds, and allows any dissolved analytes to pass through. The biological composition finally contacts the bottom filter, which filters out any remaining precipitated proteins or other particulate matter remaining in the biological composition. The eluate that emerges from the SPE cartridge may then be loaded into a LC-MS or LC-MS-MS device in order to measure any analytes that may be present in the eluate.

Typically, the analytes of interest are pharmaceutical compounds that include m-toluamide, 4-hydroxy-3-methoxyphenylacetic acid, propazine, mirtazapine, benzoylecognine, linomycin, ritonavir, N-acetyl-L-cysteine, nalidixic acid, desipramine, benzylamine, dofetilide, 2-deoxyguanosine, mifepristone, benzanilide, nifedipine, quinapril, apigenin, corticosterone, folic acid, cytosine, imiquimod, nevirapine, simazine, estrone, venlafaxine, creatinine, l-lysine, memantine, a-Methylbenzylamine, dapsone, prilocaine, desmethyldiazepam, diflucan(fluconazole), captopril, pyrimethamine, fenfluraime, dextromethorphan, xylazine, 2-deoxyadenosine, maprotiline, atrazine, mianserin, phenylbutazone, floxin(ofloxacin), niacinamide, clenbuterol, sulfadiazine, N-acetylprocainamide, promazine, 4-aminophenylacetic acid, trenbolone, tamoxifen, 5-fluorocytosine, 2-amino-3-phenyl-1-propanol, hippuric acid, sertraline, haloperidol, virginiamycin M1, vigabatrin, phenacetin(p-acetophenetidide), 4-decyloxybenzoic acid, clomipramine, fluoxetine, riboflavin, 5-aminosalicylic acid, xanthosine, mesoridazine, theobromine, clonidine, propanolol, ketoprofen, protryptiline, desmethyldiazepam, and combinations thereof. In addition, the analytes of interest may be compounds that are structurally, chemically, or functionally similar to the pharmaceutical compounds listed above.

Figure 2:
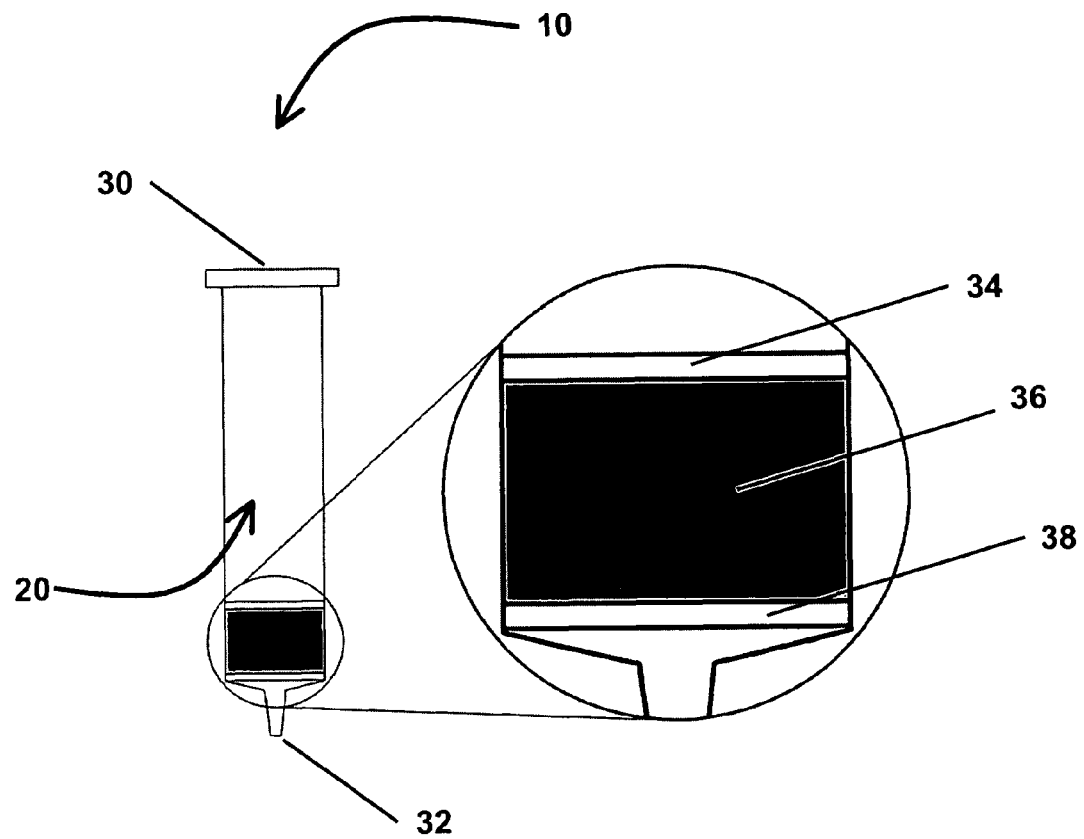
FIG. 2 shows the cartridge, filters and transition metal oxide components of the system of the present invention.

The invention further describes a system 10, shown in FIG. 2, for the selective removal of interfering components from a biological composition prior to bioanalytical analysis using measurement methods, such as LC-MS or LC-MS-MS. The system includes a cartridge 20 having a cartridge entrance 30 and a cartridge exit 32, and having a volume ranging between about 0.5 ml and about 60 ml. Inside the cartridge 20 is a top filter 34 located near the cartridge entrance 30, and a bottom filter 38 located near the cartridge exit 32. The system 10 also includes a quantity of transition metal oxide 36 bonded to substrate particles, packed inside of the cartridge 20 between the top filter 34 and the bottom filter 38.

The cartridge 20 used in the system 10 is preferably constructed from laboratory grade polypropylene, selected to avoid imparting foreign agents, such as plasticizers, phthalates, long chain hydrocarbons, or mold release agents, into the biological compositions, that could lead to further ion-suppression or ion-enhancement during subsequent LC-MS analysis. Cartridges 20 are selected from a group of containers known in the art, including syringe barrels (without plunger) having volumes ranging between about 0.5 ml and about 60 ml, SPE cartridges with volumes ranging between about 0.5 ml and about 60 ml, and 96-well plates with headspace volume capacities ranging between about 0.5 ml and about 2 ml.

The upper filter 34 and lower filter 38 are either filters or frits possessing porosities ranging between about 0.1 µm and about 50 µm. Frits are defined herein as finely porous materials through which liquids may pass. More preferably, the upper filter 34 is a frit with a porosity ranging between about 5 µm and about 20 µm, and most preferably with a porosity of about 5 µm. The lower filter 38, more preferably, is a filter with a porosity ranging between about 0.1 µm and about 1 µm, and most preferably with a porosity of about 0.2 µm.

The upper filter 34 and lower filter 38 are constructed of materials including polypropylene, polyethylene (PE), polytetrafluoroethylene (PTFE), glass, and combinations thereof. PE is a common standard material that provides good aqueous wetting capability and chemical resistance. PTFE offers good chemical resistance and limited "sample leakage" when conducting protein precipitation within a well plate or a cartridge. Most preferably, the upper filter 34 is constructed from PTFE, and the lower filter 38 is constructed from PE.

The transitional metal oxide 36 bonded to a substrate is selected for its selective binding to phosphate-containing compounds. The transition metal oxides 36 used in the system 10 include zirconia, titania, ceria, and combinations thereof. Most preferably, the transitional metal oxide 36 is zirconia bonded to porous silica particles. The quantity of transitional metal oxide 36 packed into the cartridges 20 ranges between about 20 mg and about 80 mg, and more preferably about 50 mg.

During the use of the system 10, a biological sample is combined with an organic acid, such as formic acid, in solution with a protein precipitation agent, such as acetonitrile, and introduced into the cartridge entrance 30. The resulting precipitated proteins are filtered from the biological sample by the combined filtration of the upper filter 34, the lower filter 38, and the transitional metal oxide 36 bonded to a substrate. Concurrently, within the transitional metal oxide 36 bonded to a substrate, phosphate-containing compounds are preferentially bound to the transitional metal oxide 36. Analytes, defined above, which have also have an affinity for the transitional metal oxide 36, are prevented from binding to the chromatographic media due to competitive interference and preferential retention of the organic acid, which possesses a stronger affinity for the chromatographic media than the chromatographic media has for the analytes. Rather than retaining analytes for subsequent elution, as is a common practice in the art, the selective retention of interfering compounds and the removal of precipitated proteins is conducted concurrently within the system 10. Typically, the resulting eluate containing the analytes of interest is ready to be immediately analyzed without further treatment using analytical methods, such as LC-MS or LC-MS-MS. In some instances, further sample treatment, such as evaporation and reconstitution, may be required or desired prior to analysis of the analyte.

Figure 3:
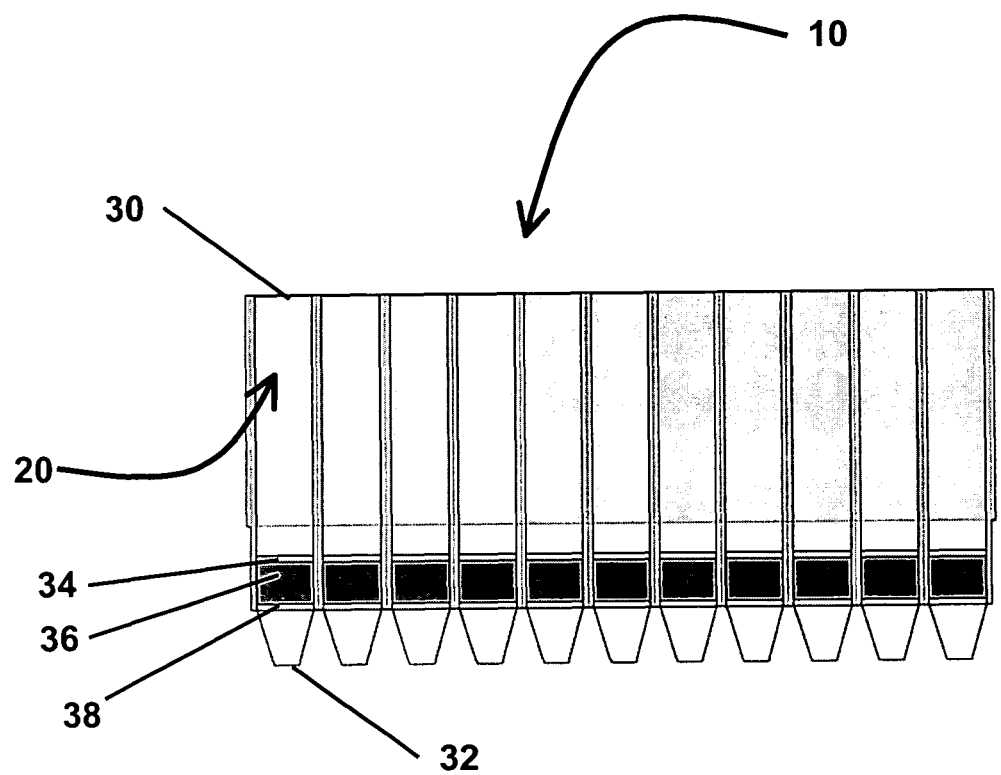
FIG. 3 shows a plurality of SPE cartridges arranged in a system.

In some embodiments, the system 10 may contain two or more cartridges 20 packed with transitional metal oxide 36 bonded to a substrate, as shown in FIG. 3, and the biological samples may be simultaneously processed in parallel. In one embodiment, each well of a 96 well plate may be used as cartridges 20 in the system 10.

The precipitated biological sample may be pulled through the system 10 via negative pressure using a vacuum manifold common in general SPE and filtration practice. Alternatively, the precipitated biological sample may be pulled through the system 10 using a positive pressure SPE manifold commonly used in general SPE and filtration practice. Any method may be used to pull or push the precipitated sample through the system 10, so long as the sample is pulled through the system 10 without damaging the system 10, the sample, or analytes within the sample.

Prior art knowledge and procedures may be applied to adapt and optimize elution protocols, for example by using organic modified buffers, aqueous miscible solvents, binary solvent mixtures, or combinations thereof, in order to achieve selective elution of the analyte. If necessary, multiple elution steps using different conditions may be employed.

As demonstrated herein, the inventive media, methods, and systems utilizing zirconia-coated silica compositions result in high retention rates of phosphate-containing compounds with minimal obstruction of the analytes of interest. Without being bound to any theory, it is believed that the features of the transition metal oxide compositions are based on their unique amphoteric ion-exchange properties in combination with exhibiting strong Lewis acid properties and acting as electron acceptors for Lewis bases, such as phosphate groups. Thus, titanium oxides and zirconium oxides show specific chemisorptions of compounds containing one or more phosphate groups.

EXAMPLES

The following examples illustrate the invention.

Example 1

Synthesis of Zirconia-Coated Silica and Titania-Coated Silica was Demonstrated Successfully To demonstrate the feasibility of coating silica with zirconia or titania substrates, a pilot study was conducted. Spherical porous silica particles (Daiso Co., Ltd., Osaka, Japan) were pretreated for bonding to the substrates by placing the silica particles into a vacuum oven at 150° C. for 16 hours under full vacuum. To assure anhydrous reaction conditions, the silica was azeotropically dried by adding the silica to HPLC-grade toluene in a 5 L round bottom flask with a Dean Stark trap attached, heating the mixture to 112° C., then draining the flask through the Dean Stark trap a total of 5 times.

After cooling the solution to 35° C., 70% zirconium propoxide in propanol was added to the solution through a dried addition funnel over a period of 1 hour. In this mixture, the zirconium propoxide was reduced to the unbound alcohol by-product, and the zirconia was grafted onto the silica for three hours at room temperature. The mixture was then heated to 112° C. for an additional 16 hours, cooled, and then filtered.

Unreacted zirconium propoxide was subsequently removed by rinsing three times with HPLC-grade toluene and then drying the reactants on the filter. After drying on the filter, the bonded silica was added to a beaker containing 1% formic acid and stirred for one hour, extracting any residual toluene by pipette as necessary.

Finally, the bonded silica was filtered, washed and dried to a constant mass. The bonded silica was filtered from the formic acid solution using a 10-20 µm glass fritted Büchner funnel, rinsed three times with deionized water, rinsed once with acetone, rinsed three times with methanol, and finally dried on the filter. After the initial drying on the filter, the bonded silica was placed into a vacuum oven and further dried until the mass of the bonded silica sample was unchanged with time.

The results of this pilot study demonstrated that zirconia may be bonded successfully to silica, yielding an SPE phase for use in solid phase extraction. Titanium or cerium alkoxides may also be bonded to silica in a similar manner to the methods described above.

Example 2

Filtration Time of Biosamples was Improved Using a Hybrid SPE-Precipitation 96-Well Plate To determine the effect of the arrangement of SPE media, frits, and membranes in the wells of a 96 well plate on the rate of filtration flow through the wells, the following experiment was conducted.

A 96-well plate was prepared in which each well was packed with SPE media that was sandwiched between a 20 μm polyethylene frit at the top of the well, and a 0.2 μm filter/membrane at the bottom of the well. Four different SPE media were used to pack the wells: 30 mg of titania-coated silica prepared using the methods described in Example 1, 30 mg of zirconia-coated silica prepared using the methods described in Example 1, 20 mg of zirconium oxide, and 100 mg of zirconium oxide. As a control, some wells contained only a 20 μm polyethylene frit at the top of each well, and a 0.2 μm filter/membrane at the bottom of each well, with no SPE media in between. For comparison, other wells contained only a standard 0.2 μm hydrophobic graded membrane that is typically used for filtrating precipitated proteins (Orochem protein crash plate, catalog number OC21 PPT20, Orochem Technologies, IL).

200 μL of biological rat plasma was added to each of the wells of the packed 96-well plate described above. 600 μL of acetonitrile, a protein precipitation agent, was then pipetted into each well, and the resulting precipitated samples were filtered by applying vacuum to the well-plate using a standard 96-well plate vacuum manifold.

Figure 4:
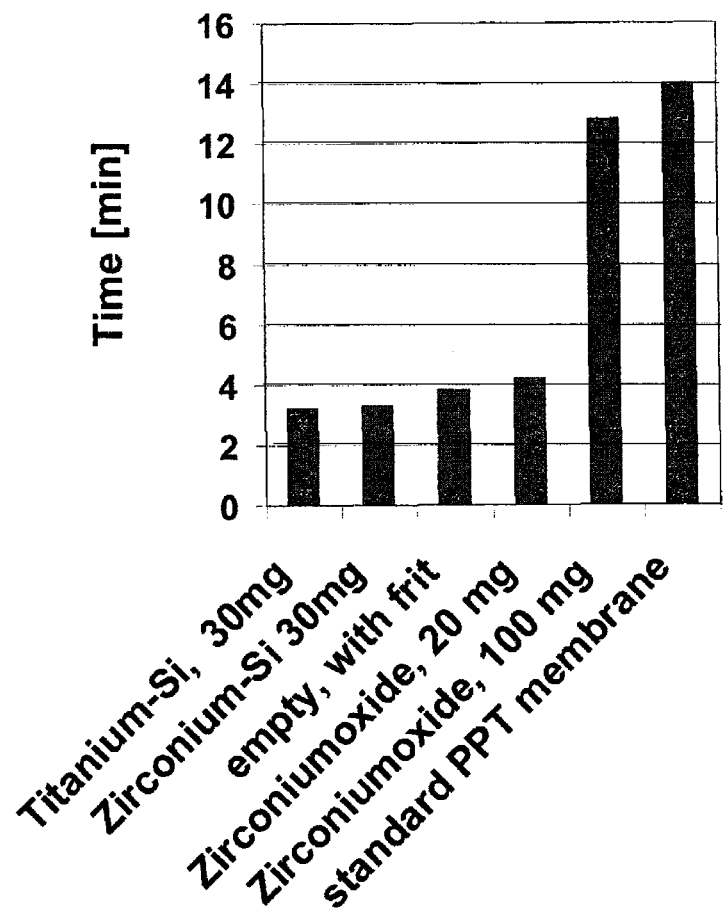
FIG. 4 is a comparison of filtration times of protein precipitated samples through wells packed with different arrangements of chromatographic media and filters.

The lengths of time taken for each of the samples to flow completely through each of the wells in the 96 well plate described above were measured and are summarized in FIG. 4. Complete sample flow-through for the titania-coated silica and zirconia-coated silica filtrations was accomplished in less than 4 minutes, whereas the complete sample flow-through for the standard 0.2 μm protein precipitation membranes took more than 14 minutes, and the complete sample flow-through for the filtration through 100 mg of zirconium oxide took more than 13 minutes The results of this experiment demonstrated that the combination of zirconia-coated silica or titania-coated silica SPE media, sandwiched between a 20 μm polyethylene frit at the top of the well and a 0.2 μm filter/membrane at the bottom of the well, significantly improved the overall sample filtration time over the previous sample preparation methods tested.

Example 3

Coating Silica SPE Media with Zirconia or Titania Significantly Improved the Extraction of Phosphatidylcholine from Samples To determine the effect of zirconia and titania coatings on the capacity of the silica SPE media for extracting phosphatidylcholine, the following study was conducted, comparing the capacities of three different SPE media.

1 ml polypropylene SPE cartridges containing the three different extraction media were prepared. The extraction media were held in place within the SPE cartridges using upper and lower 20 μm polyethylene frits. The first SPE cartridge contained 30 mg of uncoated porous silica (DAISOGEL® SP, Daiso Co., Ltd., Osaka, Japan) with a particle size of 20 μm. The second cartridge contained 30 mg of titania-coated silica, prepared using the methods described in Example 1. The third cartridge contained 30 mg of zirconia-coated silica, prepared using the methods described in Example 1. A fourth cartridge containing 30 mg of titania-coated silica was also tested to determine measurement repeatability.

Each of the SPE cartridges were loaded with 1.0 ml of a standard solution consisting of 1.0 mg/ml of phosphatidylcholine dissolved in 80% acetonitrile and 20% water. The phosphatidylcholine solution was pulled through each of the SPE cartridges drop-wise using an SPE vacuum manifold until the cartridges were dry.

The phosphatidylcholine content of the resulting filtrates were analyzed by HPLC, using a Supelco ASCENTIS® Si column (Sigma-Aldrich, St. Louis, Mo., USA) with a length of 15 cm, an inner diameter of 4.6 mm, and 5 μm particle size. The mobile phase consisted of a 2% $H_3PO_4$ solution in acetonitrile. The HPLC was conducted at a temperature of 35° C., a flow rate of 1250 μl/min and an injection volume of 5 μL. Detection was achieved using UV light at a wavelength of 205 nm.

Figure 5:
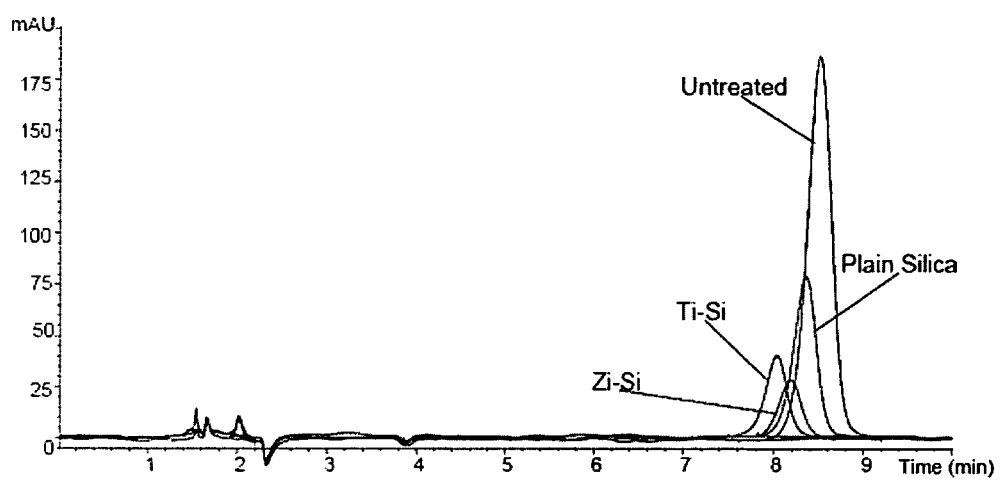
FIG. 5 is an LC-UV diagram comparing the phospholipids content of a phosphatidylcholine solution treated by filtration through SPE cartridges loaded with three different chromatographic media.
Figure 6:
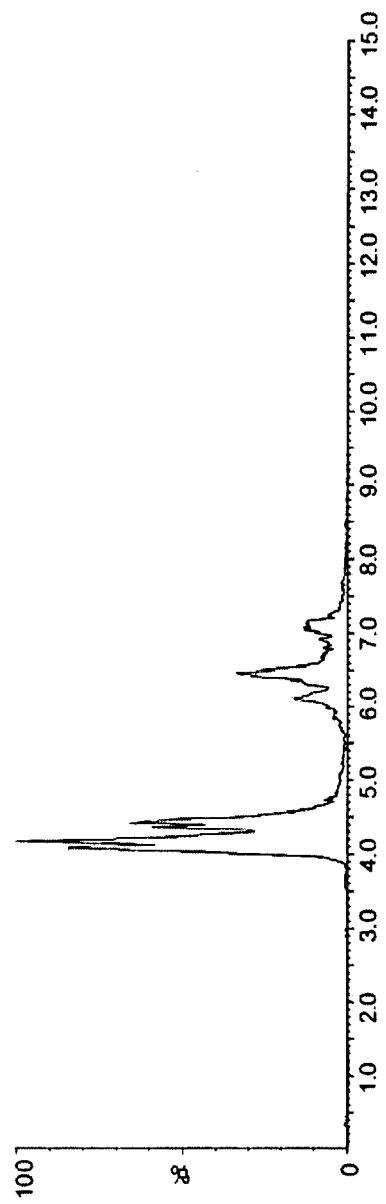
FIG. 6 is an LC-MS diagram of the phospholipids content (MRM: 184 and 104 m/z) of rat plasma after standard protein precipitation.
Figure 7:
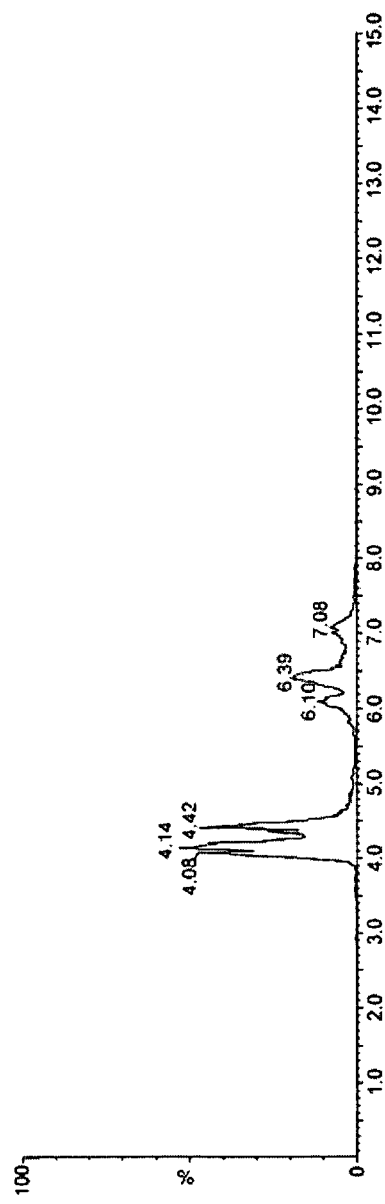
FIG. 7 is an LC-MS diagram of the phospholipids content (MRM: 184 and 104 m/z) of protein-precipitated rat plasma further treated by uncoated silica SPE filtration.
Figure 8:
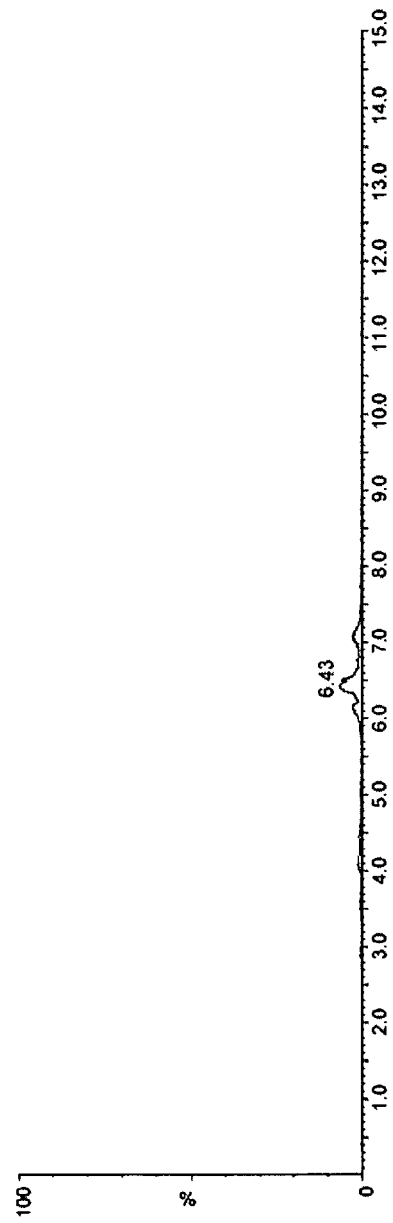
FIG. 8 is an LC-MS diagram of the phospholipids content (MRM: 184 and 104 m/z) of protein-precipitated rat plasma further treated by zirconia-coated silica SPE filtration.
Figure 9:
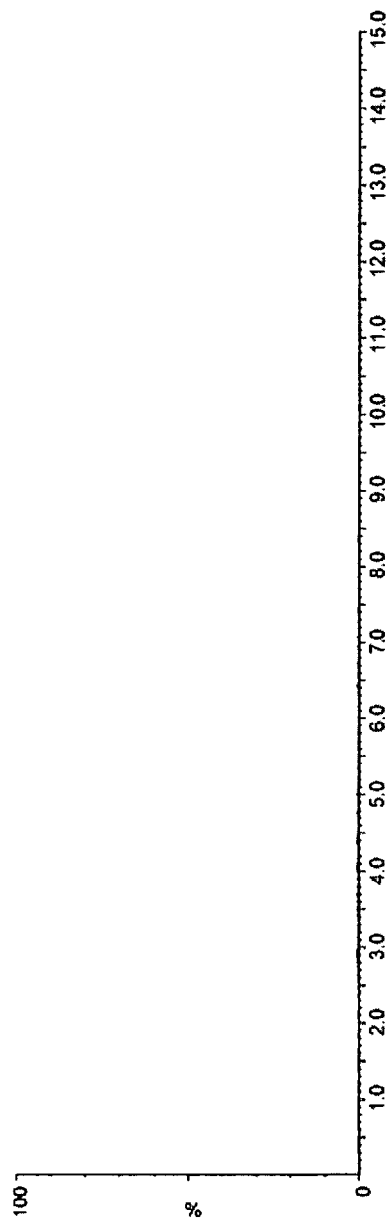
FIG. 9 is an LC-MS diagram of the phospholipids content (MRM: 184 and 104 m/z) of protein-precipitated rat plasma further treated by titania-coated silica SPE filtration.
Figure 10:
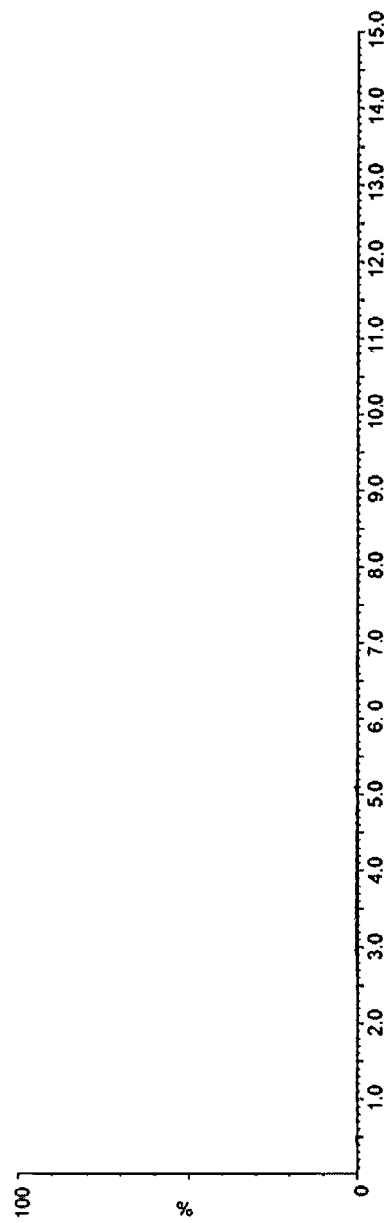
FIG. 10 is an LC-MS diagram of the phospholipids content (MRM: 184 and 104 m/z) of protein-precipitated rat plasma further treated by ceria-coated silica SPE filtration.

The HPLC diagrams obtained for the zirconia-coated silica SPE phase, titania-coated silica SPE phase, plain silica SPE phase, and the untreated standard solution are compared in FIG. 5. The HLPC measurements were converted into the masses of phosphatidylcholine retained by each type of SPE phase, and are summarized in Table 1 below:

TABLE 1

Phosphatidylcholine Retained by Three Different SPE Phases

| SPE Phase material | Mass of Phosphatidylcholine Retained (mg) | Retention by SPE Phase Material (% original) |
| --- | --- | --- |
| None (control) | 0.00 | 0% |
| Silica only | 0.61 | 61% |
| Zirconia-coated silica | 0.81 | 81% |
| Titania-coated silica | 0.87 | 87% |
| Titania-coated silica (repeat) | 0.94 | 94% |

The results of this experiment indicated that coating the silica SPE phase with either zirconia or titania, using the methods described in Example 1, significantly enhanced the capacity of the SPE phase to retain phosphatidylcholine, a common phospholipid in bioanalytical samples.

Example 4

The Capacity of Four Different SPE Phases for Phospholipid Extraction from Rat Plasma was Assessed Under Protein Precipitation Conditions Example 3 clearly demonstrated the enhanced effectiveness of titania-coated and zirconia-coated silica SPE media relative to uncoated silica SPE media at the extraction of phospholipids from a standard solution. However, the effectiveness of the coated silica extraction media under conditions similar to those likely to be used by pharmaceutical bioanalysts had not yet been measured. An experiment was conducted to compare the effectiveness of four different extraction media compositions for the removal of phospholipids from a biological sample under protein precipitation conditions.

1 ml polypropylene SPE cartridges were prepared containing four different SPE media. The SPE media was held in place within each SPE cartridge using upper and lower 20 µm polyethylene frits. The first SPE cartridge contained 30 mg of silica (DAISOGEL® SP, Daiso Co., Ltd., Osaka, Japan) with a pore size of 120 Å and a particle size of 20 µm. The second SPE cartridge contained 30 mg of zirconia-coated silica, prepared using the methods described in Example 1. The third cartridge contained 30 mg of titania-coated silica, prepared using the methods described in Example 1. A fourth cartridge contained 30 mg of ceria-coated silica, prepared using the methods described in Example 1.

For each SPE cartridge, 100 µl of rat plasma was diluted with 300 µl of a 1% formic acid solution in acetonitrile, mixed, and centrifuged to remove any precipitated protein. The resulting supernate was passed through each SPE cartridge using methods described in Example 3, and the resulting eluate for each supernate was analyzed by HPLC-MS. As a control, a separate sample was prepared and analyzed as above using protein precipitation only without further SPE filtration.

The HPLC analysis used a Supelco ASCENTIS® Si column (Sigma-Aldrich, St. Louis, Mo., USA) with a length of 5 cm, an inner diameter of 2.1 mm, and a 3 µm particle size. The HPLC was conducted at a temperature of 50° C. and a flow rate of 0.4 ml/min. The mobile phase consisted of 10 mM ammonium formate at a pH of 4.5 and methanol, the gradient of which is listed in Table 2 below:

TABLE 2

Gradient of Liquid Phase Used in HPLC Analysis

| Time (min) | Ammonium formate (%) | Methanol (%) |
|---|---|---|
| 0 | 80 | 20 |
| 0.2 | 80 | 20 |
| 0.3 | 50 | 50 |
| 1.3 | 0 | 100 |
| 10 | 0 | 100 |
| 10.5 | 80 | 20 |

The mass spectrometry analysis used a MicroMass ZQ single quadrupole instrument with the following settings and conditions: ionization: ESI+, capillary (KV): 3.50, cone (V) 60, extractor: 3, RF lens: 0, source temp: 125° C., desolvation temp: 350° C., desolvation gas: 250 l/hr, cone gas: 90 l/hr, monitoring: scan mode from 80-1000 m/z, extracted ion: 184 and 104 m/z.

LC-MS diagrams targeting phospholipid content after protein precipitation only, without any further SPE processing (control), and protein precipitation followed by SPE processing using uncoated silica, zirconia-coated silica, titania-coated silica, and ceria-coated silica are shown in FIG. 6, FIG. 7, FIG. 8, FIG. 9, and FIG. 10, respectively. The LC-MS responses for phospholipids eluted from each of the SPE media were determined and compared to protein precipitation only (control), assuming that protein precipitation resulted in 0% removal of phospholipids. The results are summarized in Table 3 below.

TABLE 3

Fraction of Phospholipid Removed by 4 Different SPE Media

| SPE Media | Phospholipid Removed by SPE Phase Material (% of original supernate) |
|---|---|
| Silica alone | 43% |
| Zirconia-coated silica | 93% |
| Titania-coated silica | 100% |
| Ceria-coated silica | 100% |

In summary, the ceria-coated silica, zirconia-coated silica, and titania-coated silica SPE phase compositions offered excellent removal of phospholipids from plasma samples after previously preparing the samples using protein precipitation methods.

Example 5

Affinity of Zirconia-Coated Silica SPE Phase to a Representative Group of Pharmaceutical Compounds and Metabolites was Assessed The zirconia-coated silica SPE phase was shown to be highly effective at screening out phospholipids in bioanalytical samples in Examples 3 and 4, even under protein precipitating conditions. An additional experiment was conducted to determine the selectivity of the zirconia-coated silica SPE phase for analytes of interest, such as pharmaceutical compounds and metabolites, under conditions sufficient for selectively removing phospholipid compounds.

SPE cartridges containing 30 mg of zirconia-coated silica were prepared as described in Example 4. Standard mix solutions of 12 different compounds consisting of 600 ng/ml of each compound dissolved in a solution of 75% acetonitrile with 1% formic acid and 25% water were prepared. 400 µl of each mix solution was passed through the SPE cartridges with the aid of a SPE vacuum manifold, and the resulting eluate for each cartridge was collected and analyzed by HPLC-MS.

The HPLC analysis used a Supelco DISCOVERY® C18 column (Sigma-Aldrich, St. Louis, Mo., USA) with a length of 5 cm, an inner diameter of 2.1 mm, and 3 µm particle size. The HPLC was conducted at a temperature of 50° C., a flow rate of 200 µl/min, and an injection volume of 5 µl. The mobile phase consisted of 95% 13 mM ammonium formate in methanol, and 5% 13 mM ammonium formate in water.

The mass spectrometry analysis used a MicroMass ZQ single quadrupole instrument with the following settings and conditions: ionization: ESI+, capillary (KV): 3.50, cone (V) 60, extractor: 3, RF lens: 0, source temp: 125° C., desolvation temp: 350° C., desolvation gas: 250 l/hr, cone gas: 90 l/hr, monitoring: scan mode from 80-1000 m/z, extracted ion: compound specific m/z.

The results of the HPLC-MS analysis for the filtrates of each of the twelve mixtures are summarized in Table 4. The results for each ingredient in each mixture was converted into the amount recovered in the filtrate, expressed as a percent of the unfiltered mixture. The target recovery level of at least 55% recovery for each compound was easily reached for 94% of the compounds included in the twelve mixtures.

TABLE 4

Recovery Rates of Mixtures Passed Through Zi-coated Silica SPE Media

| Compounds | MW (mono) | ESI+ | Amount before extraction (XIC) | Amount after extraction (XIC) | Recovery (% original) |
|---|---|---|---|---|---|
| Mixture 1 | | | | | |
| m-toluamide | 135.07 | 136.07 | 126480136 | 97264864 | 76.90 |
| 4-hydroxy-3-methoxyphenylacetic acid | 182.06 | 183.06 | 22800212 | 17278058 | 75.78 |
| propazine | 229.11 | 230.11 | 97665752 | 80976872 | 82.91 |
| mirtazapine | 265.16 | 266.16 | 105867184 | 72262248 | 68.26 |
| benzoylecognine | 289.13 | 290.13 | 62144948 | 25234658 | 40.61 |
| linomycin | 406.21 | 407.21 | 9117189 | 7604725 | 83.41 |
| Mixture 2 | | | | | |
| ritonavir | 720.31 | 721.31 | 12814102 | 8433283 | 65.81 |
| n-acetyl-l-cysteine | 163.03 | 164.03 | 38623572 | 30404742 | 78.72 |
| nalidixic acid | 232.08 | 233.08 | 9552439 | 6278669 | 65.73 |
| desipramine | 266.17 | 267.17 | 96139472 | 77405648 | 80.51 |
| benzylamine | 107.07 | 108.07 | 20964796 | 33771960 | 161.09 |
| dofetilide | 441.13 | 442.13 | 41493132 | 33249524 | 80.13 |
| Mixture 3 | | | | | |
| 2-deoxyguanosine | 267.09 | 268.09 | 25557700 | 21464814 | 83.99 |
| mifepristone | 429.26 | 430.26 | 64747208 | 53532212 | 82.68 |
| benzanilide | 197.08 | 198.08 | 66199440 | 49822108 | 75.26 |
| nifedipine | 346.11 | 347.11 | 5901884 | 4311448 | 73.05 |
| quinapril | 438.21 | 439.21 | 6574409 | 4754345 | 72.32 |
| Mixture 4 | | | | | |
| apigenin | 270.05 | 271.05 | 23970790 | 16339217 | 68.16 |
| corticosterone | 346.21 | 347.21 | 5901884 | 4311448 | 73.05 |
| folic acid | 441.13 | 442.13 | 41493132 | 33249524 | 80.13 |
| cytosine | 111.04 | 112.04 | 52176028 | 71311744 | 136.68 |
| imiquimod | 240.13 | 241.13 | 93999680 | 74645216 | 79.41 |
| nevirapine | 266.11 | 267.11 | 96139472 | 77405648 | 80.51 |
| simazine | 201.07 | 202.07 | 70499432 | 52413136 | 74.35 |
| Mixture 5 | | | | | |
| estrone | 270.16 | 271.16 | 25630924 | 25897844 | 101.04 |
| venlafaxine | 277.2 | 278.2 | 68316592 | 67112952 | 98.24 |
| creatinine | 113.05 | 114.05 | 37201524 | 30245016 | 81.30 |
| l-lysine | 146.1 | 147.1 | 12863601 | 16987302 | 132.06 |
| memantine | 179.16 | 180.16 | 41916936 | 37810432 | 90.20 |
| a-methylbenzylamine | 121.08 | 122.08 | 11023444 | 16078490 | 145.86 |
| Mixture 6 | | | | | |
| dapsone | 248.06 | 249.06 | 105494368 | 98016304 | 92.91 |
| prilocaine | 220.15 | 221.15 | 355476288 | 3.52E+08 | 99.13 |
| desmethyldiazepam | 270.05 | 271.05 | 25630924 | 25897844 | 101.04 |
| diflucan (fluconazole) | 306.1 | 307.1 | 3420399 | 2839325 | 83.01 |
| captopril | 217.07 | 218.07 | 24092826 | 20963350 | 87.01 |
| Mixture 7 | | | | | |
| pyrimethamine | 248.08 | 249.08 | 105442072 | 1E+08 | 94.96 |
| fenfluraime | 231.12 | 232.12 | 69780768 | 60936636 | 87.33 |
| dextromethorphan | 271.19 | 272.19 | 153701552 | 1.32E+08 | 85.66 |
| xylazine | 220.1 | 221.1 | 355398432 | 3.53E+08 | 99.19 |
| 2-deoxyadenosine | 251 | 252 | 6467978 | 7816253 | 120.85 |
| maprotiline | 277.18 | 278.18 | 68316592 | 67112952 | 98.24 |
| Mixture 8 | | | | | |
| atrazine | 215.09 | 216.09 | 73019280 | 57121224 | 78.23 |
| mianserin | 264.16 | 265.16 | 83827664 | 68501960 | 81.72 |
| phenylbutazone | 308.15 | 309.15 | 7037525 | 3701506 | 52.60 |
| floxin (ofloxacin) | 361.14 | 362.14 | 292219424 | | 0.00 |
| niacinamide | 122.04 | 123.04 | 28446544 | 56544360 | 198.77 |
| clenbuterol | 276.07 | 277.07 | 8158692 | 8953208 | 109.74 |
| Mixture 9 | | | | | |
| sulfadiazine | 250.05 | 251.05 | 6066408 | 3597459 | 59.30 |
| n-acetylprocainamide | 277.17 | 278.17 | 57256968 | 44192764 | 77.18 |

TABLE 4-continued

Recovery Rates of Mixtures Passed Through Zi-coated Silica SPE Media

| Compounds | MW (mono) | ESI+ | Amount before extraction (XIC) | Amount after extraction (XIC) | Recovery (% original) |
|---|---|---|---|---|---|
| promazine | 284.13 | 285.13 | 55770524 | 43027904 | 77.15 |
| 4-aminophenylacetic acid | 151.06 | 152.06 | 25719988 | 21218440 | 82.50 |
| trenbolone | 270.16 | 271.16 | 68761848 | 51695468 | 75.18 |
| Mixture 10 | | | | | |
| tamoxifen | 371.22 | 372.22 | 173316688 | 1.45E+08 | 83.56 |
| 5-fluorocytosine | 129.02 | 130.02 | 18569570 | 13626637 | 73.38 |
| 2-Amino-3-phenyl-1-propanol | 151.09 | 152.09 | 25719988 | 21218440 | 82.50 |
| hippuric acid | 179.05 | 180.05 | 98845000 | 74262880 | 75.13 |
| sertraline | 305.07 | 306.07 | 6206996 | 5953191 | 95.91 |
| haloperidol | 375.14 | 376.14 | 71763880 | 58925732 | 82.11 |
| virginiamycin M1 | 525.24 | 526.24 | 2887174 | 1472945 | 51.02 |
| Mixture 11 | | | | | |
| vigabatrin | 129.07 | 130.07 | 18569570 | 13626637 | 73.38 |
| phenacetin (p-acetophenetidide) | 179.09 | 180.09 | 98845000 | 74262880 | 75.13 |
| 4-decyloxybenzoic acid | 278.18 | 279.18 | 16968362 | 14449392 | 85.15 |
| clomipramine | 314.15 | 315.15 | 37481840 | 31531476 | 84.12 |
| fluoxetine | 309.13 | 310.13 | 6154572 | 7095674 | 115.29 |
| riboflavin | 376.13 | 377.13 | 24951728 | 16573426 | 66.42 |
| 5-aminosalicylic Acid | 153.04 | 154.04 | 16568016 | 10365297 | 62.56 |
| Mixture 12 | | | | | |
| xanthosine | 284.07 | 285.07 | 55770524 | 37640212 | 67.49 |
| mesoridazine | 386.14 | 387.14 | 87603968 | 54980640 | 62.76 |
| theobromine | 180.06 | 181.06 | 25590428 | 23044046 | 90.05 |

The results of this experiment demonstrated that the zirconia-coated silica SPE media possessed a low affinity for the overwhelming majority of the compounds tested, representing a variety of pharmaceutical compounds and metabolites.

Example 6

Effectiveness of Zirconia-Coated Silica at Removing Phospholipids from Rat Plasma was Compared with Zirconium Oxide Particles An experiment was conducted to evaluate the performance of a zirconia-coated silica SPE media, in comparison to pure zirconium oxide in the extraction of phospholipids for bioanalytical samples.

A 96-well plate was prepared by packing SPE media into each well using two opposing filter/frits. The upper frit consisted of a 20 µm porosity polyethylene frit and the lower frit consisted of a 0.2 µm filter/frit commonly used to filter out particulate biomatter after protein precipitation. The extraction media tested consisted of: 50 mg of zirconium oxide particles, 180 mg of zirconium oxide particles, and 50 mg of zirconia-coated silica particles.

As a control, 100 µl of rat plasma sample was subjected to standard protein precipitation without SPE processing using the method described in Example 4. The remaining test samples were subjected to hybrid SPE/protein precipitation by first applying 100 µl of rat plasma, followed by 300 µl of acetonitrile with 1% formic acid into each test well. The plate was then agitated for 1 minute, and vacuum was applied to draw the samples through the wells. The resulting eluate from each well was collected and analyzed directly by HPLC.

The HPLC analysis used a Supelco ASCENTIS® Express C18 column (Sigma-Aldrich, St. Louis, Mo., USA) with a length of 5 cm, an inner diameter of 4.5 mm, and 2.7 µm particle size. The HPLC was conducted at a temperature of 35° C. and a flow rate of 500 µl/min. Mass-spectrometry detection was conducted using a Sciex API 3200 Q TRAP with the following settings and conditions: ionization: ESI+, ion-source: turbospray, ion-spray voltage: 5500 V, source temperature: 425° C., ion-source gas 1: 35 psi, ion-source gas 2: 45 psi, declustering potential: 125 V, entrance potential: 10 V, MRM transitions: phospholipids (184 m/z and 104 m/z). The mobile phase consisted of 10 mM ammonium acetate and 10 mM ammonium acetate in acetonitrile, the gradient of which is listed in Table 5 below.

TABLE 5

Gradient of Mobile Phase Used in HPLC Analysis

| Time (min) | Ammonium acetate (%) | Ammonium acetate in acetonitrile % |
|---|---|---|
| 0 | 95 | 5 |
| 10 | 50 | 50 |
| 18 | 50 | 50 |
| 18.1 | 95 | 5 |
| 22 | 95 | 5 |

Figure 11:
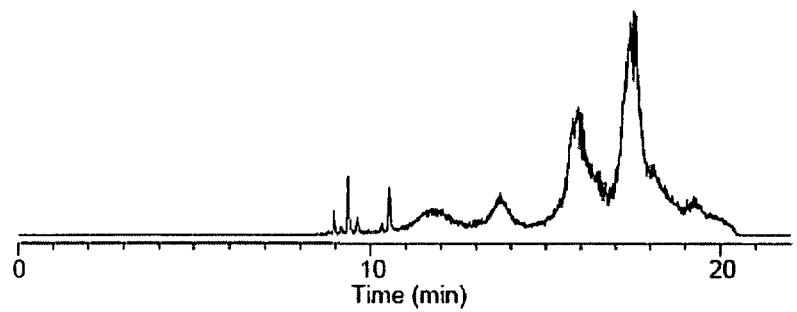
FIG. 11 is an LC-MS diagram of the phospholipids content (MRM: 184 and 104 m/z) of rat plasma after standard protein precipitation.
Figure 12:
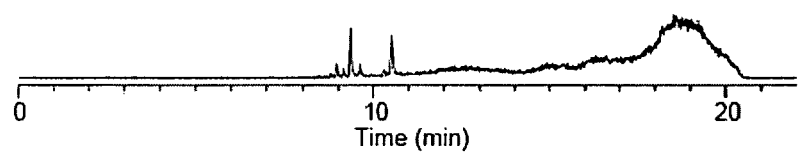
FIG. 12 is an LC-MS diagram of the phospholipids content (MRM: 184 and 104 m/z) of a protein-precipitated rat plasma sample after further SPE filtration using 50 mg zirconium oxide.
Figure 13:
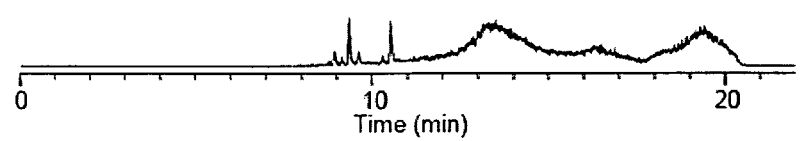
FIG. 13 is an LC-MS diagram of the phospholipids content (MRM: 184 and 104 m/z) of a protein-precipitated rat plasma sample after further SPE filtration using 180 mg zirconium oxide.

The HPLC diagram obtained for the rat plasma sample that was protein precipitated, but not filtered by SPE, is shown in FIG. 11. The HPLC diagram obtained for the protein-precipitated rat plasma sample filtered by SPE using 50 mg of zirconium oxide particles in the well, 180 mg of zirconium oxide particles in the well, and 50 mg of zirconia-coated silica particles in the well are shown in FIG. 12, FIG.

Figure 14:
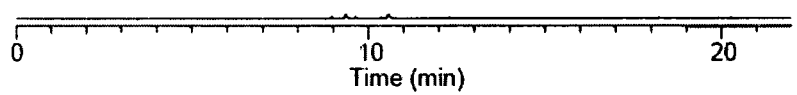
FIG. 14 is an LC-MS diagram of the phospholipids content (MRM: 184 and 104 m/z) of a protein-precipitated rat plasma sample after further SPE filtration using 50 mg zirconia-coated silica.

13 and FIG. 14 respectively. The peak response levels of the detected phospholipids for each processed sample were measured and compared against the peak response level of the control sample resulting from standard protein precipitation without further SPE filtration. The percent of phospholipids removed relative to the phospholipids removed using protein precipitation alone are summarized in Table 6.

TABLE 6

Phospholipids Removed by Different Sample Preparation Protocols

| Sample Preparation | % Phospholipid Removal |
|---|---|
| Standard Protein Precipitation | 0% |
| Zirconium Oxide 50 mg | 46% |
| Zirconium Oxide 180 mg | 49% |
| Zirconia-coated Silica 50 mg | 99% |

The results of this experiment demonstrated the enhanced capacity for the binding of phospholipids by the zirconia-coated silica media relative to the zirconium oxide media. Pure zirconium oxide had limited effectiveness in bioanalytical sample preparation applications due to its low capacity for the removal of phospholipids. The high surface area of the zirconia-coated silica particles enhanced the capacity of this media to a level sufficient to remove 99% of the sample's phospholipids relative to the phospholipids removed by standard protein precipitation methods.

Example 7

Hybrid SPE/Protein Precipitation Used to Determine the Magnitude of Ion Suppression Effects of Phospholipids on Detection of Selected Compounds To determine the effect of phospholipids on the ionization of non-acidic compounds in electrospray positive ion mode LC-MS, an experiment was conducted to compare the response levels of these non-acidic compounds detected by LC-MS in the presence and absence of phospholipids. The experiment proceeded in two stages. Biological samples processed by either standard protein precipitation or hybrid SPE/protein precipitation (protein precipitation followed by zirconium-coated silica SPE filtration) were analyzed in a manner in which the phospholipids that were inadequately removed during each sample prep process were selectively retained chromatographically on a C18 reverse phase HPLC column. Subsequent injection of a standard mixture of non-acidic compounds into the HPLC columns enabled the overlap of phospholipids with the non-acidic compounds resulting in an effective method for the determination of the ion-suppression effect of phospholipids. By modifying the gradient conditions of the phospholipids, retention overlap of the non-acidic standard mixture with the desired range of phospholipid species was controlled.

Rat plasma samples were subjected to standard protein precipitation using the methods described in Example 4. An aliquot of the supernate resulting from the protein-precipitated rat plasma samples was further subjected to filtration through a 1 ml SPE cartridge containing 30 mg of zirconia-coated silica SPE media for phospholipid removal, using the methods described in Example 4.

The effect of the phospholipids extracted from rat plasma samples, using the hybrid SPE/protein precipitation method, described in Example 4, on the ionization of the test mixture was assessed by comparing the LC-MS diagrams of selected compounds in the presence and absence of the extracted phospholipids. The measurements used to determine this effect were performed in two sequential stages.

Initially, the blank rat plasma samples processed by standard protein precipitation alone or protein precipitation followed by zirconium-coated silica SPE filtration were injected onto the chromatographic columns and retained through the gradient system described in Table 7 below. The gradient described in Table 7 was designed to retain any phospholipids still evident in the samples after sample processing. Next, a standard solution consisting of 100 ng/ml each of clonidine, protryptiline, clomipramine and desmethyldiazepam was prepared, injected into the same chromatographic column, and LC-MS analysis was performed using the gradient given in Table 8 below. By selectively overlapping the standard compounds with the phospholipids during chromatographic analysis, the ionization effect of phospholipids on the standard compounds was determined. The methods used in this experiment eliminated other potentially confounding factors, such as endogenous biological sample salts or anticoagulants, which can also cause ion-suppression.

The HPLC analysis used a Discovery C18 column (Sigma-Aldrich, St. Louis, Mo., USA) with a length of 5 cm, an inner diameter of 2.1 mm, and a 3 µm particle size. The HPLC was conducted at a temperature of 50° C. and a flow rate of 200 µl/min and an injection volume of 5 µl. The mobile phase consisted of 13 mM Ammonium Acetate in Methanol and 13 mM Ammonium Acetate in Water. The gradient used in the first stage of the experiment is given in Table 7 below, and the gradient used in the second stage of the experiment is given in Table 8 below:

TABLE 7

Gradient of Liquid Phase Used in Stage 1 of HPLC Analysis

| Time (min) | Ammonium Acetate in Water (%) | Ammonium Acetate in Methanol (%) |
|---|---|---|
| 0 | 40 | 60 |
| 7 | 40 | 60 |
| 12 | 0 | 100 |
| 17 | 0 | 100 |

TABLE 8

Gradient of Liquid Phase Used in Stage 2 of HPLC Analysis

| Time (min) | Ammonium Acetate in Water (%) | Ammonium Acetate in Methanol (%) |
|---|---|---|
| 0 | 0 | 100 |
| 7 | 0 | 100 |
| 12 | 40 | 60 |
| 17 | 40 | 60 |

Figure 15:
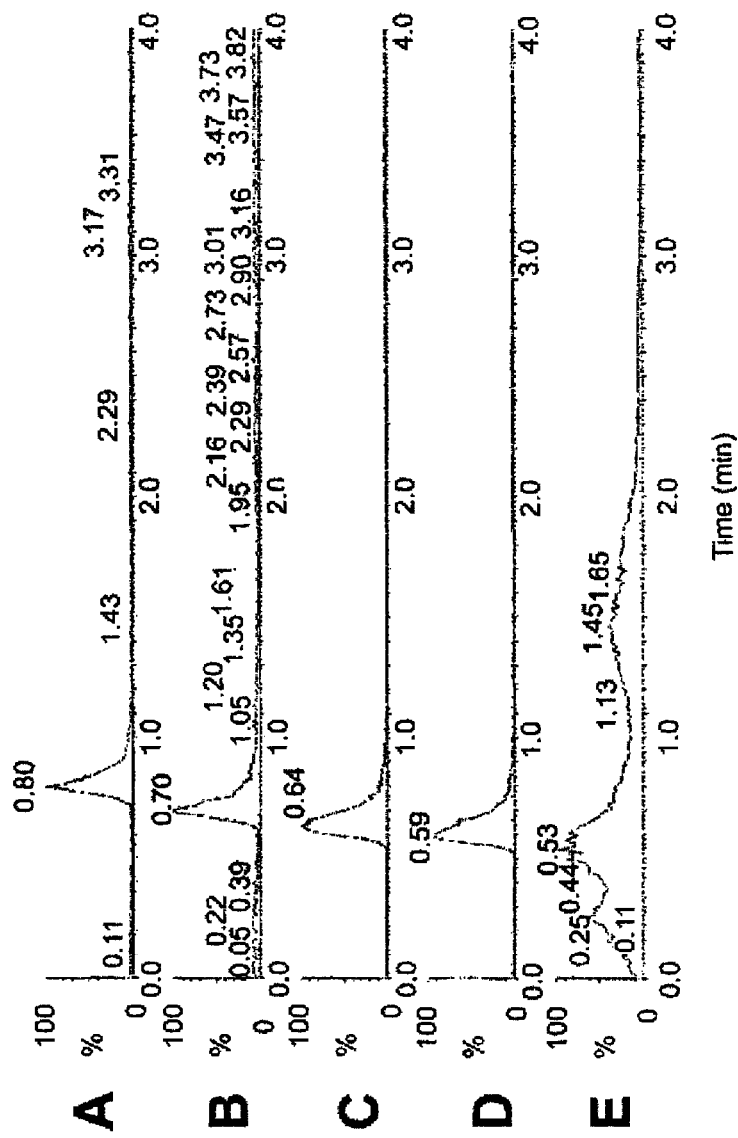
FIG. 15 is a series of LC-MS diagrams that depict the ion-traces (MRM) and co-elution of each of the analytes of interest with phospholipids injected in stage 1.

The mass spectrometry analysis used a MicroMass ZQ single quadrupole instrument with the following settings and conditions: ionization: ESI+, capillary (KV): 3.50, cone (V) 40, extractor: 3, RF lens: 0, source temp: 125° C., desolvation temp: 350° C., desolvation gas: 250 l/hr, cone gas: 90 l/hr, monitoring: scan mode from 80-400 m/z, extracted ion: 184, 230,264, 271, and 315 m/z. The HPLC diagrams showing the amounts of Clonidine (m/z 230), Protryptiline (m/z 264), Clomipramine (m/z 315), Desmethyldiazepam (m/z 271), and Phospholipids (m/z 184). Using this two-step gradient, co-elution of the phospholipids with analytes was achieved, and is shown in FIG. 15.

In the second stage of this experiment, LC-MS response levels of each of the non-acidic test compounds were determined using columns prepared using injections of blank rat plasma sample subjected to protein precipitation alone, using injections of blank rat plasma sample subjected to protein precipitation followed by zirconium-coated silica SPE filtration, or control columns prepared using no prior injections. The results were expressed as percent response of each compound that was measured using the control column. The results are summarized in Table 9.

TABLE 9

Effect of Phospholipids on Ionization of 4 Compounds Added to Rat Plasma Samples Prepared Using Protein Precipitation and Hybrid SPE/Protein Precipitation

| Rat plasma sample preparation | Clonidine (m/z 230) (% ionization response) | Protryptiline (m/z 264) (% ionization response) | Desmethyldiazapam (m/z 271) (% ionization response) | Clomipramine (m/z 315) (% ionization response) |
|---|---|---|---|---|
| Hybrid SPE/ Protein Precipitation | 96.70% | 104.11% | 102.55% | 97.81% |
| Standard Protein Precipitation Alone | 54.50% | 44.72% | 81.85% | 110.91% |

The ion-suppression effect of phospholipids on the non-acidic compounds tested resulted in up to 50% signal suppression when overlapped with extracts derived from standard protein precipitation of rat plasma. When using the hybrid SPE/protein precipitation approach, more than 99% of the phospholipids were extracted from the rat plasma sample resulting in minimal signal suppression of the non-acidic compounds tested.

Example 8

The Effect of Formic Acid on Analyte Recovery After Sample Preparation Using the Hybrid SPE/Protein Precipitation Method was Determined for Two Representative Pharmaceutical Compounds Previous examples, described above, involve an initial step of mixing the 100 μL bioanalytical sample with a dilute formic acid in acetonitrile solution. An experiment was conducted to determine the effect of formic acid on analyte recovery and phospholipid removal using hybrid SPE/protein precipitation methods of the present invention. Formic acid is a strong enough Lewis Base to prevent most acidic pharmaceutical compounds from binding with the zirconia ions in the SPE phase of the present invention, and may also inhibit the binding of non-acidic pharmaceutical compounds to residual silanol groups on the silica support surface of the SPE phase.

The effects of variations in the formic acid/acetonitrile mixture used in the initial steps of the hybrid SPE/protein precipitation sample preparation method on efficiency of analyte recovery was assessed for two representative drug compounds: propranolol, a non-acidic compound, and ketoprofen, an acidic compound.

A hybrid SPE 96-well plate was prepared by packing 50 mg of zirconia-coated silica particles (as prepared in Example 1) into each well between two opposing filter/frits. The upper frit consisted of a 5 μm porosity PTFE frit and the lower consisted of a 0.2 μm filter/frit commonly used to filter out particulate bio-matter after protein precipitation. 100 μl rat plasma samples spiked at the level of 100 ng/ml ketoprofen and propanol were transferred in duplicate to the individual wells of the 96-well plate followed by 300 μl acetonitrile containing formic or acetic acid at a concentration ranging between 0% and 2%. The 96-well plate was vortexed for 1 minute, and vacuum pressure was applied to the well plate using a 96-well plate vacuum manifold and the resulting eluate was analyzed directly via LC-MS analysis.

The HPLC analysis used a Discovery HS F5 column (Sigma-Aldrich, St. Louis, Mo., USA) with a length of 100 cm, an inner diameter of 2.1 mm, and a particle size of 3 μm. The HPLC was conducted at a temperature of 50° C. and a flow rate of 200 μl/min and an injection volume of 5 μl. The mobile phase consisted of 13 mM Ammonium Acetate in Methanol and 13 mM Ammonium Acetate in Water. The gradient used for the HPLC analysis is given in Table 10 below.

TABLE 10

Gradient of Liquid Phase Used in HPLC Analysis

| Time (min) | Ammonium Acetate in Water (%) | Ammonium Acetate in Methanol (%) |
|---|---|---|
| 0 | 75 | 25 |
| 2 | 95 | 5 |
| 4.5 | 95 | 5 |
| 5 | 75 | 25 |
| 7 | 75 | 25 |

Mass-spectrometry detection was conducted using a Sciex API 3200 Q TRAP with the following settings and conditions: ionization: ESI+, curtain gas (psi): 25, ion-source: turbospray, ion-spray voltage (V): 4500, source temperature (° C.): 450, ion-source gas 1 (psi): 35, ion-source gas 2 (psi): 20, collision gas (psi): 4, MRM Transitions: propanolol (260.30/116.10) and ketoprofen (255.20/209.10).

The LC-MS data for the samples containing propanol and ketoprofen were analyzed to determine the percent absolute recovery of each compound. Absolute recovery was calculated against external calibration standards (data not shown). The results are summarized in Table 11 to compare the effects of formic and acetic acid on the absolute recovery of propanolol and ketoprofen.

TABLE 11

Effect of Organic Acid Concentration on the Recovery of Acidic and Non-acidic Pharmaceutical Drug Compounds after Hybrid SPE/Protein Precipitation

| Percent of organic acid in solution with acetonitrile | Propanolol (Non-acidic) Recovery (% of original sample) | | Ketoprofen (Acidic) Recovery (% of original sample) | |
|---|---|---|---|---|
| | Formic acid used | Acetic acid used | Formic acid used | Acetic acid used |
| 0.0% | 73% | 73% | 0% | 0% |
| 0.1% | 77% | 73% | 0% | 0% |
| 0.2% | 75% | 70% | 35% | 7% |
| 0.5% | 72% | 72% | 84% | 51% |
| 1.0% | 75% | 70% | 96% | 69% |
| 1.5% | 77% | 68% | 114% | 78% |
| 2.0% | 77% | 72% | 114% | 78% |

The results of this study indicated that the addition of organic acid enhanced the recovery of pharmaceutical acidic compounds processed using the hybrid SPE/protein precipitation method. The zirconia-coated silica SPE phase retained ketoprofen, an acidic pharmaceutical compound, in the absence of any organic acid, but with the addition of either formic acid or acetic acid, the recovery of ketoprofen was greatly enhanced. Although both organic acids enhanced the recovery of ketoprofen, formic acid completely inhibited the retention of ketoprofen by the HybridSPE phase, as evidenced by the 100% recovery for concentrations of formic acid that were 1% or greater, as shown in Table 11. By contrast, the organic acids had negligible impact on the recovery of the non-acidic molecule propanolol for any of the organic acid concentrations tested.

Example 9

Analyte Recovery Using Hybrid SPE/Protein Precipitation Methods was Determined to be Sensitive to Variations in the Relative Proportion of Protein Precipitation Agent Used To further optimize the hybrid SPE/protein precipitation sample preparation method, an experiment was conducted to determine the effect of the relative volume of protein precipitation agent added to the bioanalytical sample during the hybrid SPE/protein precipitation method on the subsequent recovery of analytes.

The wells of a 96 well plate were packed with 50 mg of zirconia-coated silica SPE media, as described in Example 8. Rat plasma samples were spiked at the levels of 100 ng/ml propanolol and ketoprofen. 100 µl aliquots of the spiked rat plasma were added to each test well and mixed with either 1% formic acid in acetonitrile or 1% acetic acid in acetonitrile. The precipitating agent volume ratios tested in this experiment ranged from 1:3 (100 µl plasma: 300 µl precipitating agent) to 1:5 (100 µl plasma: 500 µl precipitating agent). The resulting eluate derived from each test was analyzed using HPLC-MS as described in Example 8.

The HPLC-MS data for the samples containing propanol and ketoprofen were analyzed to determine the percent absolute recovery of each compound. Absolute recovery was calculated against external calibration standards (data not shown). A comparison of the effects of the amount of organic acid/precipitating agent added to biological samples on the absolute recovery of propanolol and ketoprofen are summarized in Table 12.

TABLE 12

Effect of the Volume of Protein Precipitation Agent Relative to Sample Volume on the Recovery of Acidic and Non-acidic Pharmaceutical Drug Compounds after Hybrid SPE/Protein Precipitation

| Ratio of Sample Volume to Protein Precipitation Agent Volume | Propanolol (Non-acidic) Recovery (% of original sample) | | Ketoprofen (Acidic) Recovery (% of original sample) | |
|---|---|---|---|---|
| | Formic acid used | Acetic acid used | Formic acid used | Acetic acid used |
| 1:2 | 70% | 68% | 68% | 44% |
| 1:3 | 75% | 70% | 96% | 69% |
| 1:5 | 70% | 62% | 107% | 82% |

The results of this experiment indicated that the recovery of ketoprofen, an acidic pharmaceutical molecule, was sensitive to relative volume of protein precipitation agent used in the hybrid SPE/protein precipitation process. A minimum ratio of protein precipitation agent to sample volume ratio of 3:1 was necessary for optimal recovery of the ketoprofen analyte. Although a 5:1 volume ratio provided a slightly better recovery of ketoprofen, the added volume of protein precipitation agent diluted the sample, resulting in decreased sensitivity during analysis (data not shown).

Based on the results of the present example, as well as the results presented in Example 8, the likely optimal precipitation agent was determined to be 1-2% formic acid in acetonitrile, added to the bioanalytical sample at a 3:1 ratio (precipitation agent:sample). Formic acid is an ideal reagent for the hybrid SPE/protein precipitation because it was not a strong enough Lewis base to displace the phosphate moiety inherent with phospholipids from the zirconia SPE functional groups, but the formic acid was strong enough to keep carboxylic acid moieties, such as those found in most acidic pharmaceutical compounds, from binding to the Zr—Si phase used in the hybrid SPE/protein precipitation method. While formic acid did not play a major role in controlling non-acidic compound binding, formic acid minimized secondary cation-exchange interactions between the exposed silanol groups on the silica SPE surface and non-acidic compounds.

Example 10

Filtration of Hybrid SPE/Protein Precipitated Samples was Optimized Through the Use of a PTFE Upper Frit Previous methods of hybrid SPE/protein precipitation described in Examples 2 and 6 utilized standard 20 µm PE (polyethylene) upper frits. However, continued use of this method revealed that protein precipitation within the 96-well plate and subsequent filtration using the frit/packed-bed/filter assembly resulted in a very cloudy eluate. Such cloudiness may lead to subsequent system failure during LC-MS-MS due to clogging and/or increased backpressure. The cloudiness was due to the plasma samples partially leaking through the upper frit prior to the addition of the precipitating agent, resulting in some of the proteins in the samples precipitating after the eluates had passed through the packed bed assemblies.

An experiment was conducted to determine the effect of the material composition and porosity of the upper frit on the turbidity of the eluate in the hybrid SPE/protein precipitation system. 96-well plates were prepared as described in Example 6, in which 50 mg of zirconia-coated silica media was packed in a 96-well SPE plate. The bottom filter/frit consisted of a 0.2 µm porosity filter/frit assembly common in standard 96-well precipitation plates. The upper frits tested in the example consisted of 20-µm porosity PE filters, 5-µm porosity PTFE (polytetrafluoroethylene) filters, 7-µm porosity PE filters, and 10-µm porosity PTFE filters.

Blank rat plasma samples were processed using the 96-well plate described above and the hybrid SPE/protein precipitation method described in Example 6. The resulting eluate of each test well was collected for visual inspection and analysis. The results of the visual analysis are summarized in Table 13.

TABLE 13

The Effect of Upper Frit Types on the Turbidity of Eluates Resulting from the Hybrid SPE/Protein Precipitation of Rat Plasma

| Upper Frit Type and Porosity in Well | Visual Turbidity of Eluates |
|---|---|
| 20 µm PE | Most cloudy |
| 5 µm PTFE | Clear |
| 7 µm PE | Very cloudy |
| 10 µm PTFE | Little cloudy |

PTFE, a hydrophobic polymer used to mold one of the frit materials under investigation, inhibited the passage of the aqueous plasma sample, requiring negative pressure to induce the flow of the sample through the frit into the SPE media below. However, the pore size of the 10-µm PTFE frit lowered the impedence of the filter sufficiently to allow the passage of some aqueous plasma prior to the addition of the protein precipitation agent to the well. Both the 7-µm PE and 20-µm PE frits also allowed plasma sample to pass through to the SPE media prior to the addition of the protein precipitation agent. Using the 5-µm PTFE frit greatly enhanced the effectiveness of the hybrid SPE/protein precipitation method by impeding the flow of the aqueous bioanalytical sample long enough to allow time for the addition of a protein precipitation agent prior to the passage of the sample through the frit to the SPE media in the well. The hydrophobic nature of the acetonitrile used as a protein precipitating agent facilitated flow through the upper frit. 400 µl of the protein-precipitated bioanalytical sample liquid passed through the entire well assembly (5 µm PTFE upper frit+SPE media+0.2 µm lower filter) in 1-2 minutes, compared to the standard protein precipitation method in which the same amount of bioanalytical sample took about 5-10 minutes to flow through the entire well assembly, which contained only a single 0.2 µm filter.

The results of this experiment demonstrated that a 5 µm PTFE upper filter is optimal for the hybrid SPE/protein precipitation method, since this filter delayed the flow of the bioanalytical sample into the SPE media just long enough to give time for the addition of protein precipitation agent, yet the device allowed the entire 400 µl of the bioanalytical sample to flow through the entire well assembly in less that two minutes (data not shown).

Example 11

Hybrid SPE/Protein Precipitation Sample Preparation Method Compared to Existing SPE Methods and Existing Protein Precipitation Methods To assess the effectiveness of the hybrid SPE/protein precipitation sample treatment method relative to other benchmark sample treatment processes, an experiment was conducted to compare the performance of the hybrid SPE/protein precipitation method to standard SPE sample treatment methods as well as standard protein precipitation methods.

A hybrid SPE 96-well plate was prepared using the method described in Example 8. The SPE media used for comparison in this example consisted of Oasis® HLB SPE media (Waters, Inc.) which is a macroporous copolymer of divinylbenzene and N-vinylpyrrolidone, and YH—OH SPE media (Yuhai Chemical Technologies) which is a macroporous hydroxylated polystyrene/divinylbenzene polymer. Both SPE phases were packed separately into 1 ml polypropylene SPE cartridges between two 20-µm porosity PE frits. The bed weight for the Oasis HLB and YH—OH media was 60 mg and 50 mg, respectively.

Rat plasma was spiked with propanolol and ketoprofen at the level of 100 ng/ml for each compound. 100 µl of blank and spiked rat plasma were subjected to hybrid SPE/protein precipitation using the method described in Example 6. 100 µl of blank and spiked rat plasma were separately subjected to standard protein precipitation (without further SPE processing) as described in Example 4. For the standard SPE methods using Oasis HLB and YH—OH SPE cartridges, 200 µl of blank and spiked rat plasma were loaded onto each separate SPE cartridge after preconditioning with 1 ml methanol followed by 1 ml deionized water with the aid of an SPE vacuum manifold. After sample loading, the cartridges were washed with 1 ml of 5% methanol in deionized water twice, and eluted with 1 ml methanol. The resulting eluate was evaporated under nitrogen to dryness and reconstituted with 800 µl 75% acetonitrile containing 1% formic acid. The resulting eluate or supernate of some of the blank rat plasma samples processed through standard SPE and standard protein precipitation methods were spiked with ketoprofen and propanolol at the level of 100 ng/ml after sample treatment prior to HPLC-MS analysis. The resulting eluate or supernate derived from each test was analyzed by HPLC-MS using the method described in Example 8.

Figure 16:
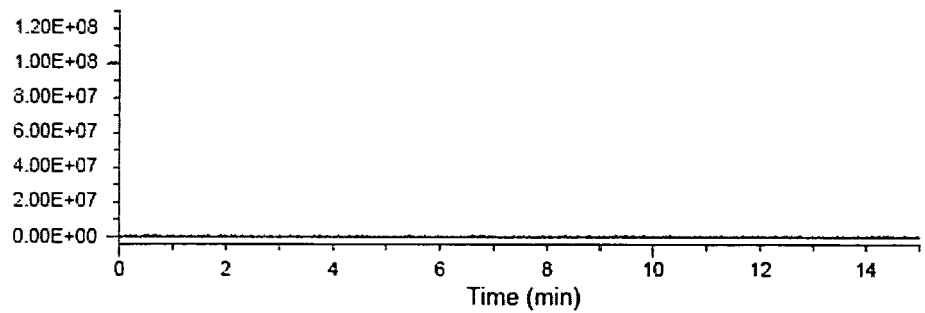
FIG. 16 is an LC-MS diagram of the phospholipid content (m/z 184) of blank rat plasma treated after protein precipitation by zirconia-coated silica SPE filtration.
Figure 17:
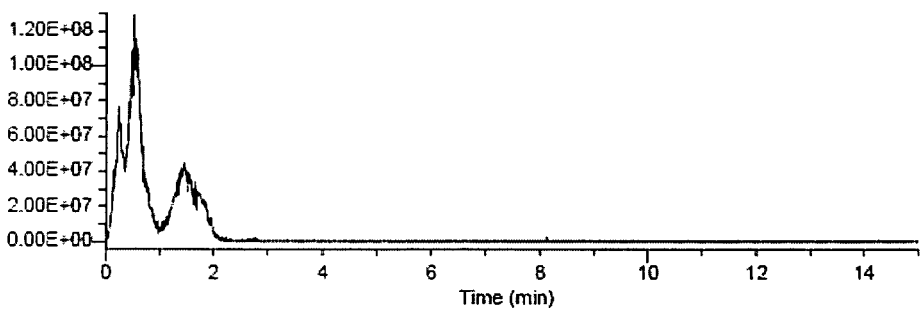
FIG. 17 is an LC-MS diagram comparing the phospholipids content (m/z 184) of blank rat plasma treated using protein precipitation alone.
Figure 18:
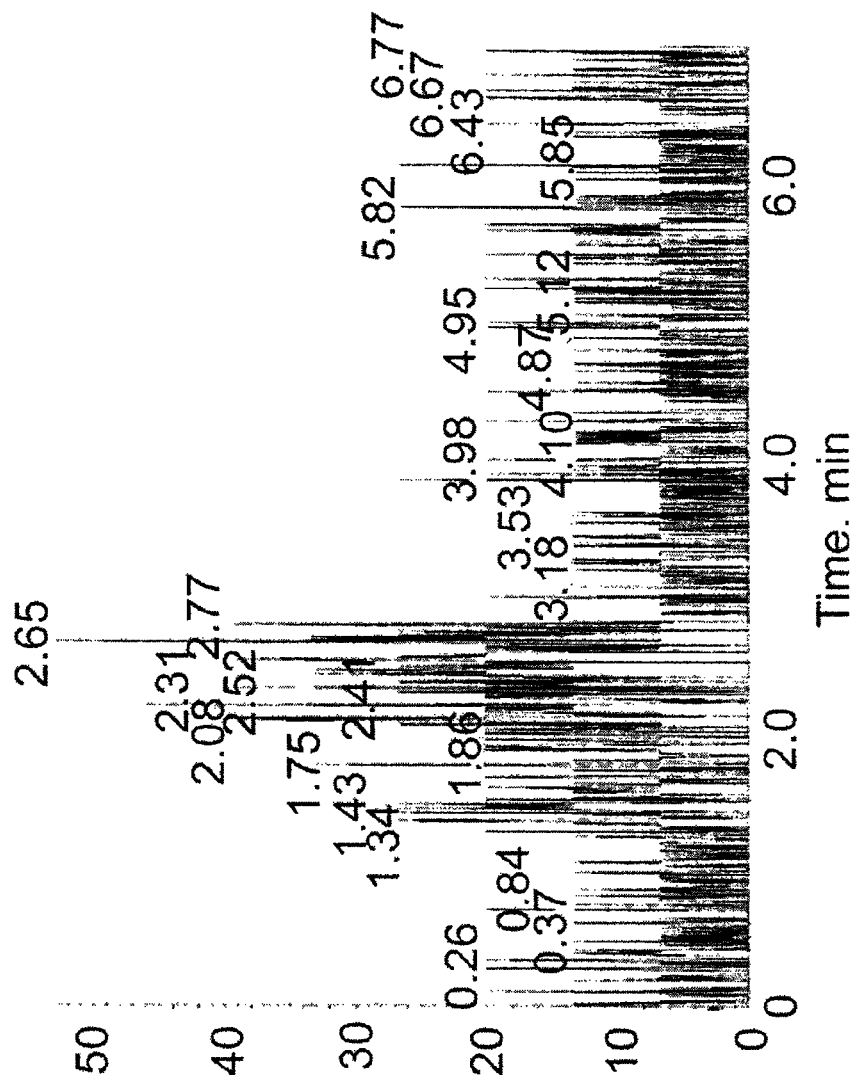
FIG. 18 is an LC-MS diagram (total ion chromatogram) of blank rat plasma processed by the hybrid SPE/protein precipitation method.
Figure 19:
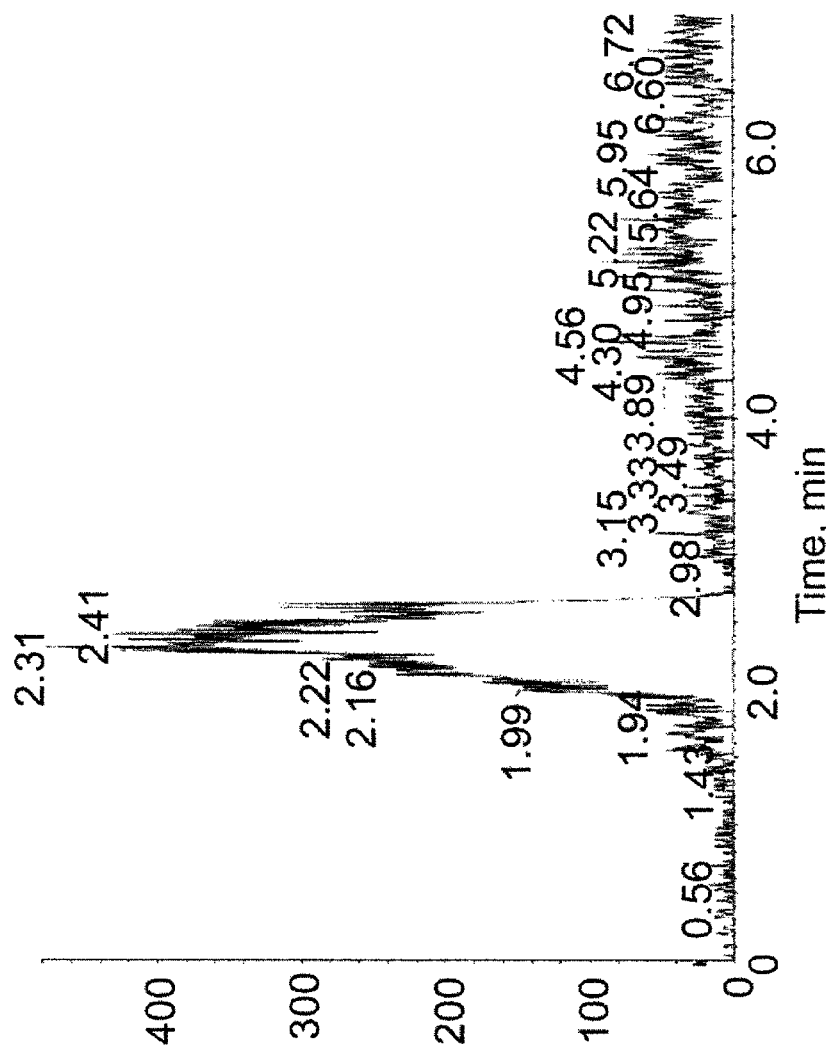
FIG. 19 is an LC-MS diagram (total ion chromatogram) of blank rat plasma processed by standard protein precipitation alone.
Figure 20:
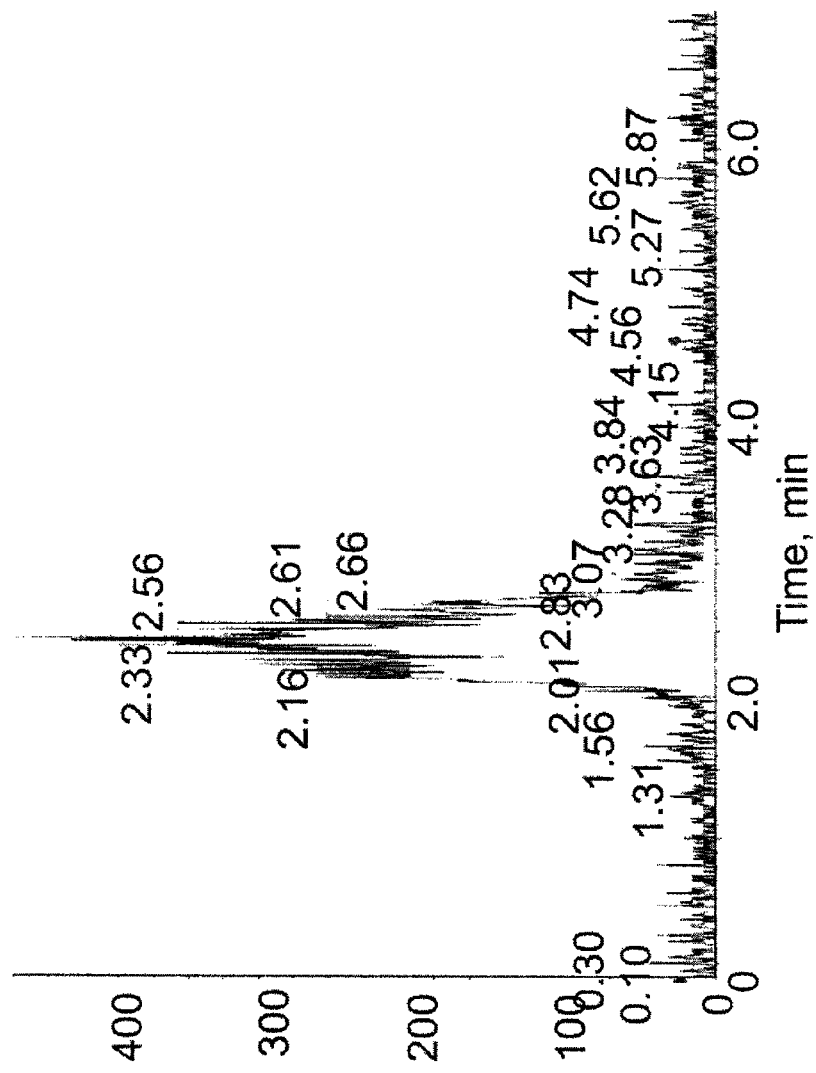
FIG. 20 is an LC-MS diagram (total ion chromatogram) of blank rat plasma processed by standard SPE methodology using Oasis HLB.
Figure 21:
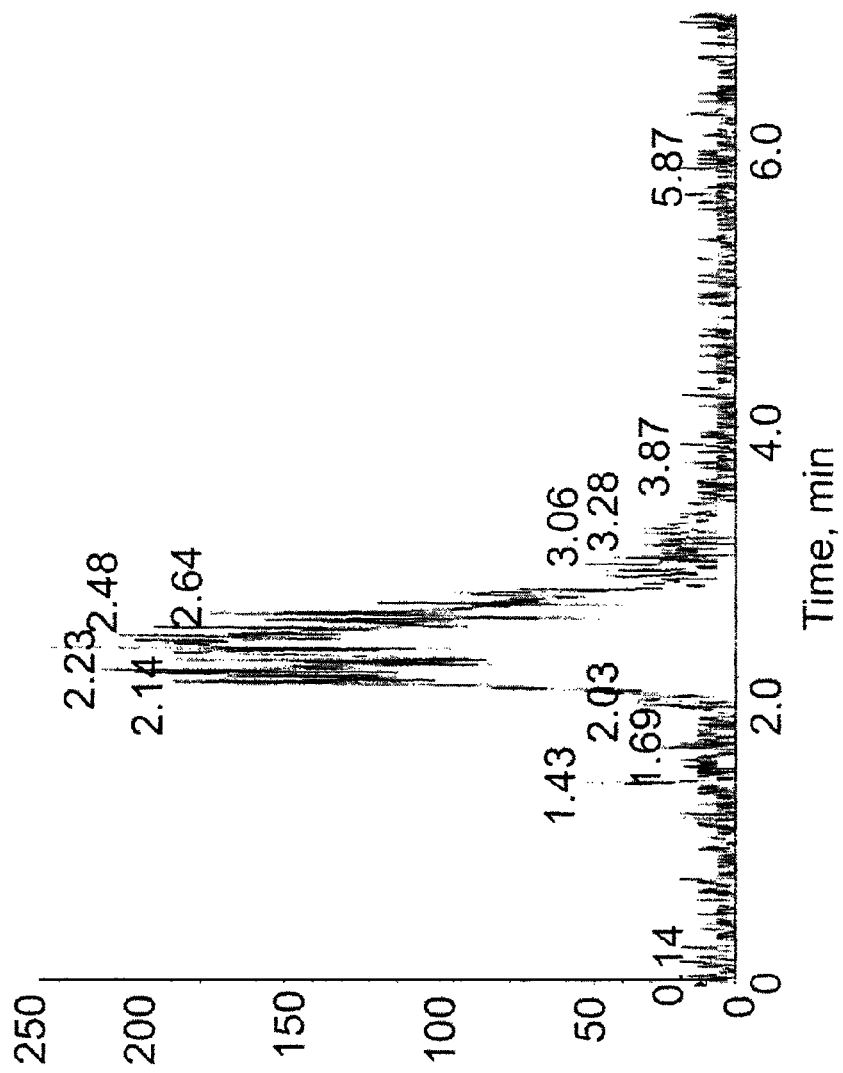
FIG. 21 is an LC-MS diagram (total ion chromatogram) of blank rat plasma processed by standard SPE methodology using YH—OH.
Figure 22:
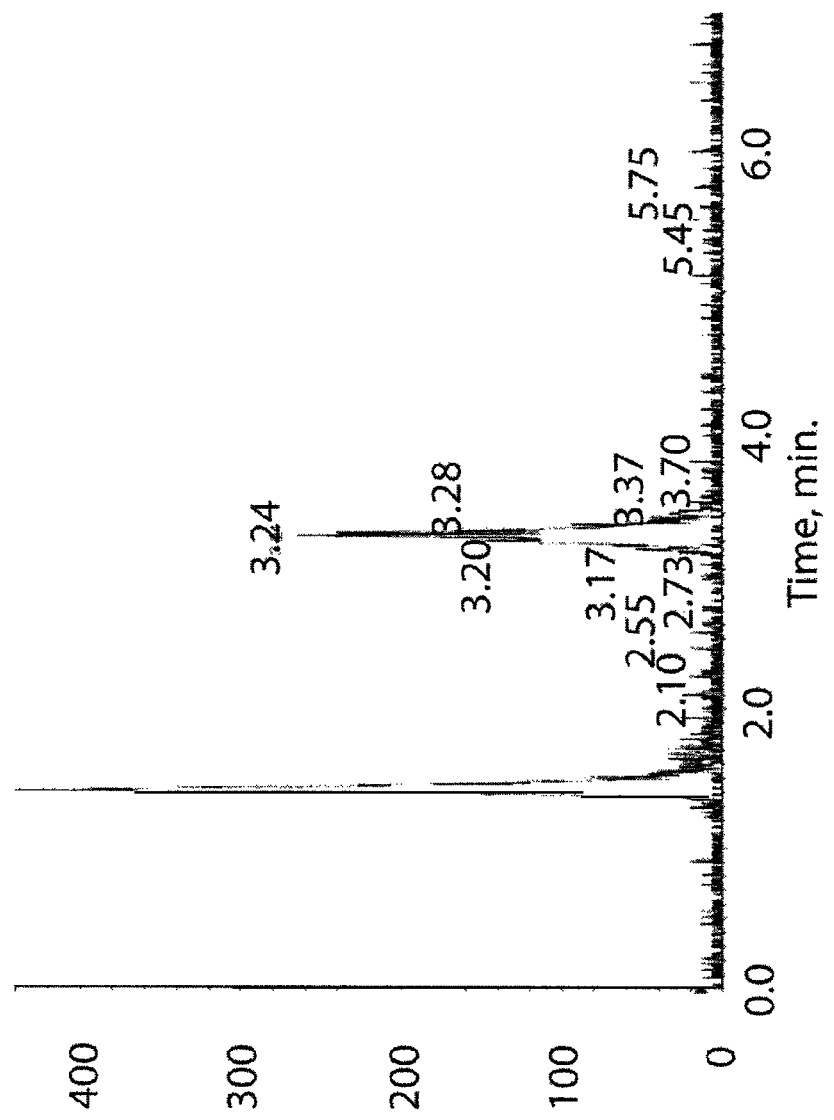
FIG. 22 is an LC-MS diagram (MRM Transitions: propanolol (260.30/116.10) and ketoprofen (255.20/209.10)) of 100 ng/ml ketoprofen and propanolol spiked plasma processed by the hybrid SPE-protein precipitation method.
Figure 23:
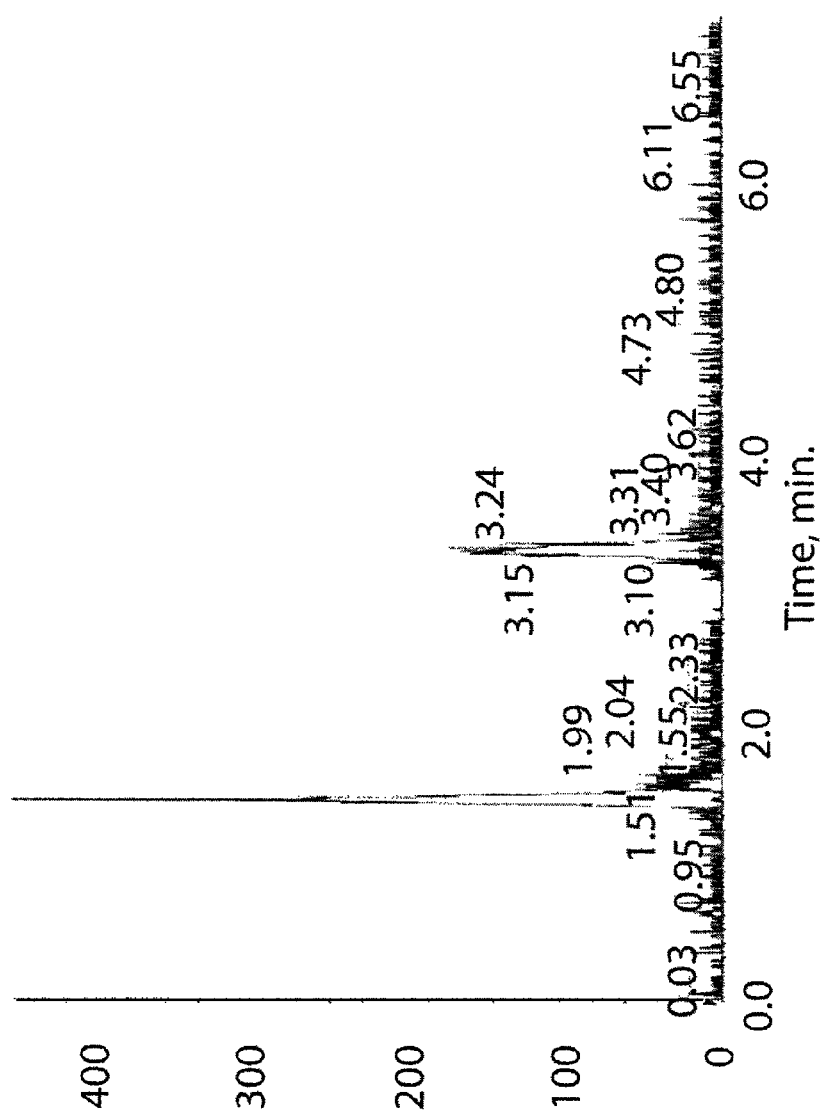
FIG. 23 is an LC-MS diagram (MRM Transitions: propanolol (260.30/116.10) and ketoprofen (255.20/209.10)) of 100 ng/ml ketoprofen and propanolol spiked plasma processed by standard protein precipitation alone.
Figure 24:
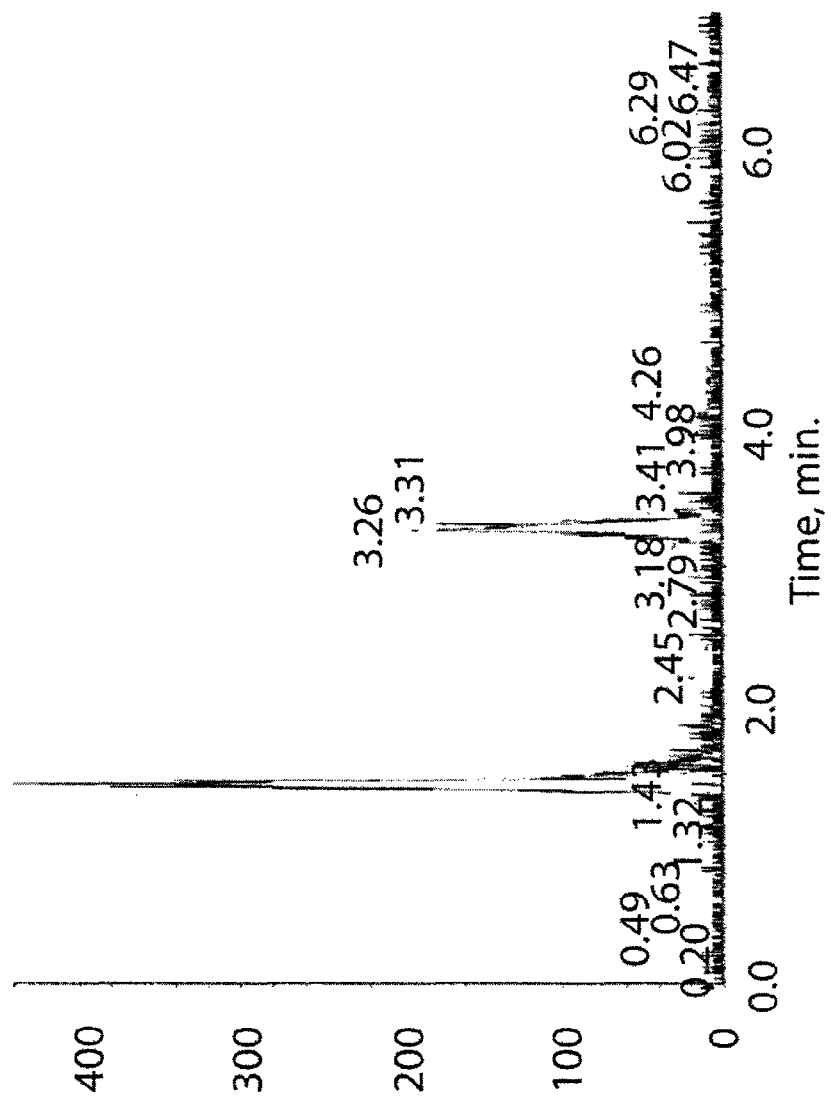
FIG. 24 is an LC-MS diagram (MRM Transitions: propanolol (260.30/116.10) and ketoprofen (255.20/209.10)) of 100 ng/ml ketoprofen and propanolol spiked plasma processed with standard SPE methodology using YH—OH.
Figure 25:
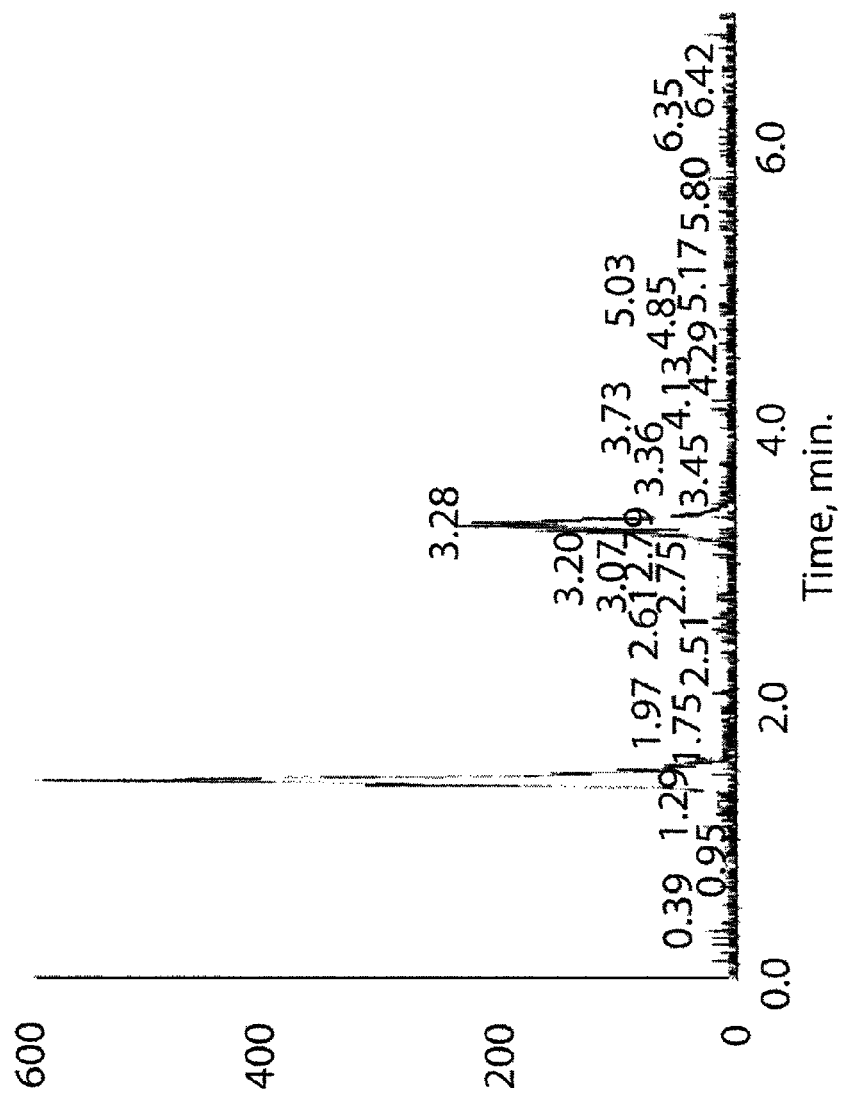
FIG. 25 is an LC-MS diagram (MRM Transitions: propanolol (260.30/116.10) and ketoprofen (255.20/209.10)) of 100 ng/ml ketoprofen and propanolol spiked plasma processed by standard SPE methodology using Oasis HLB.

After sample treatment using one of the four methods described and/or subsequent spiking with the pharmaceutical molecules, all samples were subjected to analysis to determine the absolute recovery of the pharmaceutical compounds achieved using each of the sample treatment methods. Absolute recovery was calculated against an external calibration curve for each of the compounds tested (data not shown). FIG. 16 is an LC-MS diagram (m/z 184) of the blank rat plasma, with no pharmaceutical molecules added, after treatment using the hybrid SPE/protein precipitation method. FIG. 17 is an LC-MS diagram (m/z 184) of the blank rat plasma, with no pharmaceutical molecules added, after treatment using protein precipitation alone. FIG. 18 is an LC-MS diagram (total ion chromatograms) of the blank rat plasma, with no pharmaceutical molecules added, after treatment using the hybrid SPE/protein precipitation method, indicating that all phospholipids and proteins were eliminated from the sample. FIGS. 19, 20, and 21 are LC-MS diagrams (total ion chromatograms) of the blank rat plasma, with no pharmaceutical molecules added, after sample treatment using protein precipitation only, after standard SPE using Oasis HLB media, and after standard SPE using YH—OH media, respectively. These figures indicate that none of the existing methods were as effective as the hybrid SPE/protein precipitation method at eliminating the potentially interfering endogenous sample components, such as proteins and phospholipids, from the bioanalytical samples tested.

Figure 26:
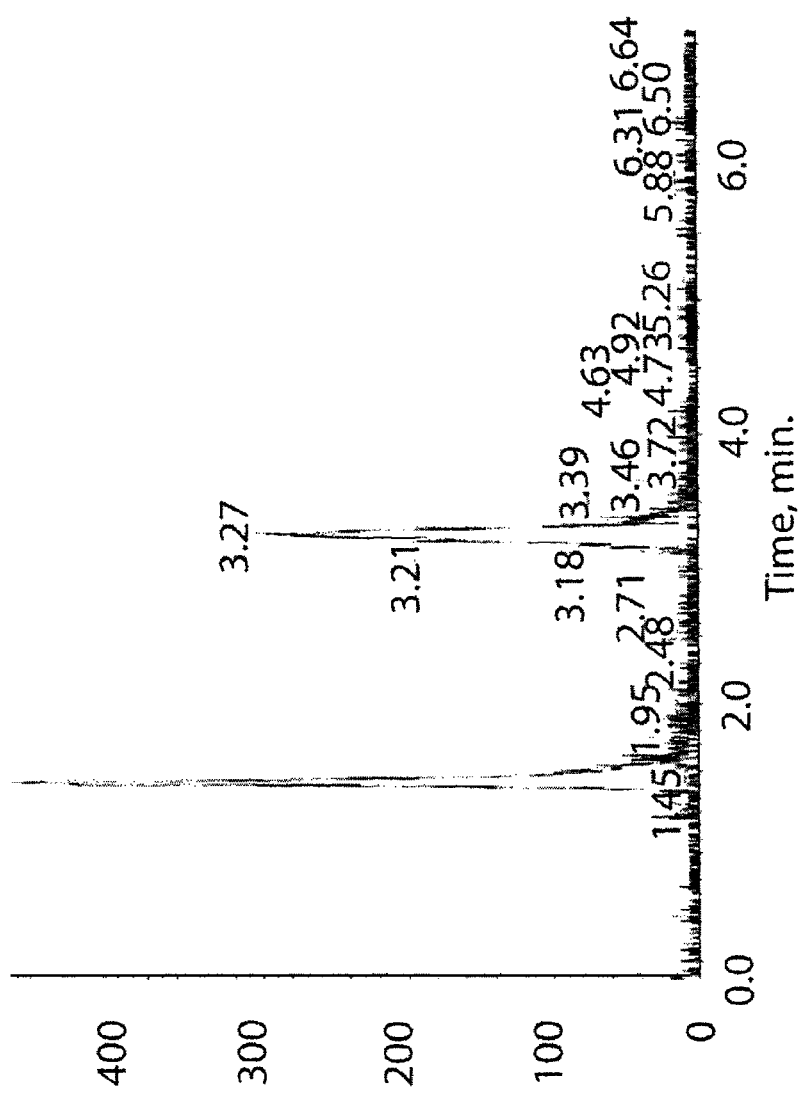
FIG. 26 is an LC-MS diagram (MRM Transitions: propanolol (260.30/116.10) and ketoprofen (255.20/209.10) of 100 ng/ml ketoprofen and propanolol spiked into the eluent of blank rat plasma after treatment with standard SPE methodology using YH—OH.
Figure 27:
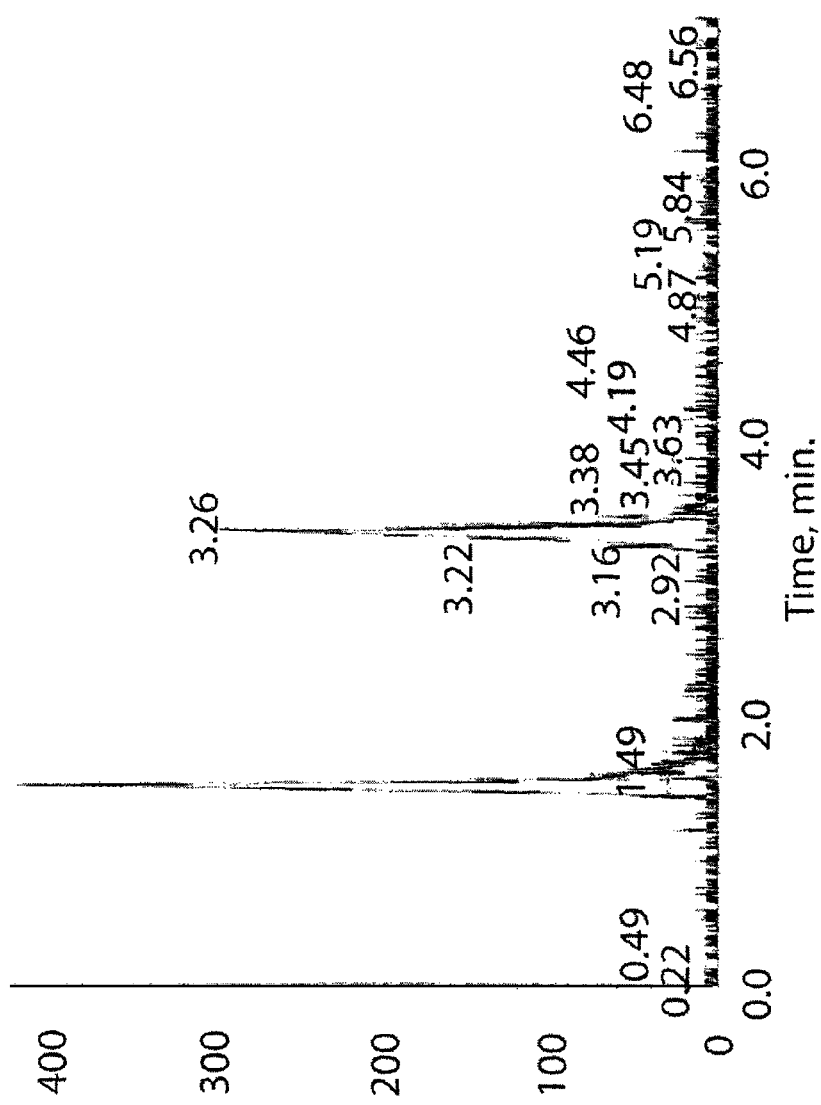
FIG. 27 is an LC-MS diagram (MRM Transitions: propanolol (260.30/116.10) and ketoprofen (255.20/209.10)) of 100 ng/ml ketoprofen and propanolol spiked into the eluent of blank rat plasma after treatment with standard SPE methodology using Oasis HLB.

FIGS. 22, 23, 24, and 25 are LC-MS diagrams (MRM Transitions: propanolol (260.30/116.10) and ketoprofen (255.20/209.10)) of rat plasma with pharmaceutical molecules added prior to sample treatment using the hybrid SPE/protein precipitation method, protein precipitation only, standard SPE using the YHOH media, and standard SPE using the Oasis HLB media, respectively. FIGS. 26 and 27 are HPLC-MS diagrams (MRM Transitions: propanolol (260.30/116.10) and ketoprofen (255.20/209.10)) of rat plasma with pharmaceutical molecules added after SPE sample treatment using the YHOH media, and the Oasis HLB media, respectively. The data resulting from HPLC-MS of the samples spiked with pharmaceutical molecules before and after filtration through the various chromatographic media as described above were analyzed to determine the absolute recovery of analytes after sample treatment. Table 14 shows a summary of these data.

TABLE 14

Comparison of Compound Recovery After Treatment of Samples Using 4 Different Sample Preparation Methods

| Sample Preparation Method | Time of Addition of Pharmaceutical Molecules | Ketoprofen (Acidic) Recovery (% original sample) | Propanolol (Non-acidic) Recovery (% of of original sample) |
|---|---|---|---|
| Hybrid SPE/ Protein Precipitation | Pre-treatment | 82.0% | 68.0% |
| Standard Protein Precipitation | Pre-treatment | 58.8% | 37.0% |
| YHOH SPE | Pre-treatment | 78.4% | 42.0% |
|  | Post-treatment | 89.6% | 82.0% |
| Oasis HLB SPE | Pre-treatment | 76.4% | 44.4% |
|  | Post-treatment | 78.4% | 72.0% |

The data summarized in Table 16 indicated that treating the bioanalytical sample using protein precipitation alone recovered the smallest percentage of the pharmaceutical molecules of any treatment tested. Pre-treatment of the bioanalytical samples using the hybrid SPE/protein precipitation method as well as the other two standard SPE treatments yielded a similar level of recovery of the acidic ketoprofen molecules. However, both of the other two standard SPE sample treatments had significant adsorption of the non-acidic propranolol molecules, and required additional steps, such as conditioning, washing, elution, evaporation, and reconstitution, in order to recover propranolol with adequate selectivity prior to HPLC-MS analysis.

The results of this experiment indicated that sample preparation using the hybrid SPE/protein precipitation method was as fast and easy as the standard protein precipitation method, and provided a higher recovery of drug compounds in the bioanalytical samples. The hybrid SPE/protein precipitation method demonstrated a recovery of drug compounds that was comparable to existing SPE sample preparation techniques, and yielded much cleaner samples.

Example 12

Zirconia-Coated Silica SPE Phase was Compared to Ceria-SCX Lanthanide Phase for Effectiveness at Removing Phospholipids from Bioanalytical Samples Experiments were conducted to evaluate the performance of the zirconia-coated silica SPE media in comparison to the lanthanide-loaded strong cation exchange (SCX) SPE media for the treatment of bioanalytical samples. The zirconia-coated silica SPE media was compared to the ceria-loaded SCX SPE media, as well as to the standard SCX SPE media, using the standard protein precipitation sample preparation as a reference, for the effective extraction of phospholipids from rat plasma.

1-ml SPE cartridges were packed with 30 mg of SPE phase, as described in Example 3, using zirconia-coated silica SPE media or SCX SPE media consisting of a benzene sulfonic acid functional group polymerically bonded to 40-60 µm silica particles. In addition, ceria-loaded SCX SPE cartridges were prepared by first packing 1 ml SPE cartridges with SCX SPE as described above. The SCX cartridges were then conditioned with 2 ml methanol followed by 2 ml deionized water with the aid of an SPE vacuum manifold at a flow rate of 1 drop per second. Next, a 2 ml saturated solution of cerium acetate was passed through the cartridge followed by a 2 ml deionized water wash, a 2 ml methanol wash, and vacuum application prior to use.

Rat plasma was subjected to protein precipitation by combining 1 ml of rat plasma with 3 ml of 1% formic acid in acetonitrile followed by 1 minute of agitation and 3 minutes of centrifugation at 15,000 rpm. A 400 µl aliquot of the resulting supernate was passed through each of the SPE cartridges described above at a flow rate of 1 drop per second with the aid of an SPE vacuum manifold.

The phospholipid contents of the resulting eluate from each cartridge were analyzed using HPLC-MS. The HPLC analysis used a ASCENTIS® Express C18 column (Sigma-Aldrich, St. Louis, Mo., USA) with a length of 5 cm, an inner diameter of 2.1 mm, and 2.7 µm particle size. The mobile phase consisted of a 10 mM solution of ammonium acetate in a 95:5 solution of methanol and water. The HPLC was conducted at a temperature of 50° C., a flow rate of 200 µl/min, an injection volume of 10 µl, and a run time of 30 minutes.

The mass spectrometry analysis used an LCQ Ion Trap single quadrupole instrument with the following settings and conditions: ionization: ESI+, capillary (KV): 15, cone (V) 6.0, extractor: 2, RF lens: 0, source temp: 200° C., desolvation temp: 350° C., desolvation gas: 250 l/hr, cone gas: 90 l/hr, monitoring: scan mode from 80-1000 m/z, and extracted ions: m/z 184, 496, 784, 786, and 834. The extracted ions were specific to the major phospholipid ions present in bioanalytical samples.

Figure 28:
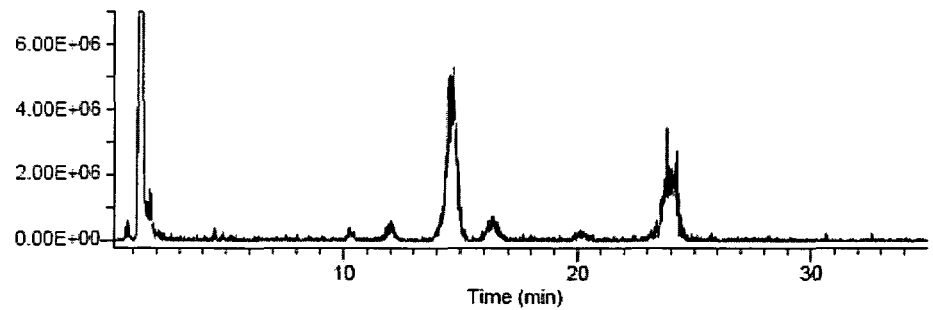
FIG. 28 is an LC-MS diagram of the phospholipids content (extracted ions from total ion chromatogram: m/z 184, 496, 784, 786, and 834) of a rat plasma sample treated using protein precipitation alone.
Figure 29:
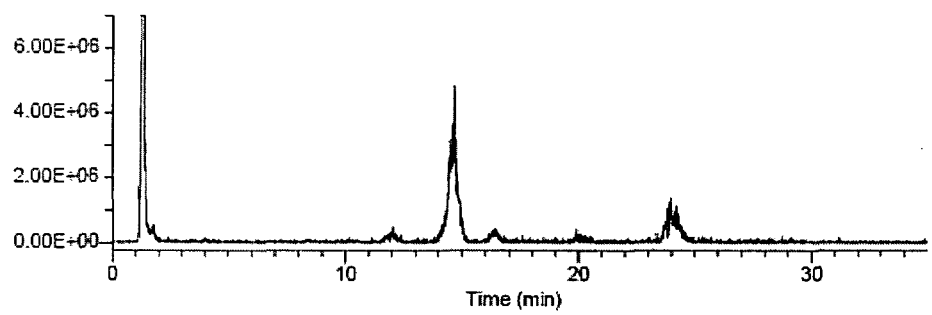
Figure 30:
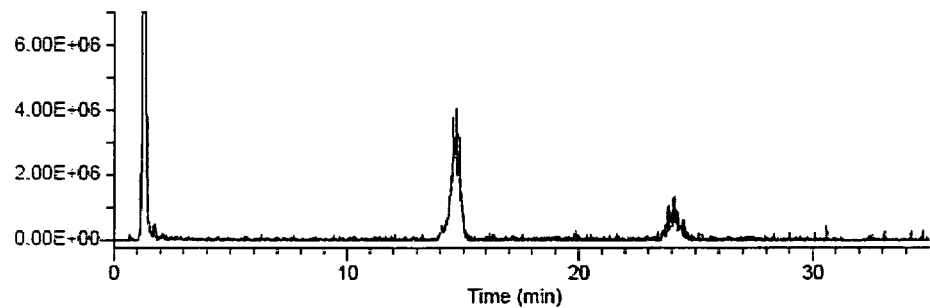
FIG. 30 is an LC-MS diagram of the phospholipids content (extracted ions from total ion chromatogram: m/z 184, 496, 784, 786, and 834) of a rat plasma sample treated using protein precipitation followed by filtration through a SPE cartridge packed with ceria-loaded SCX chromatographic media.
Figure 31:
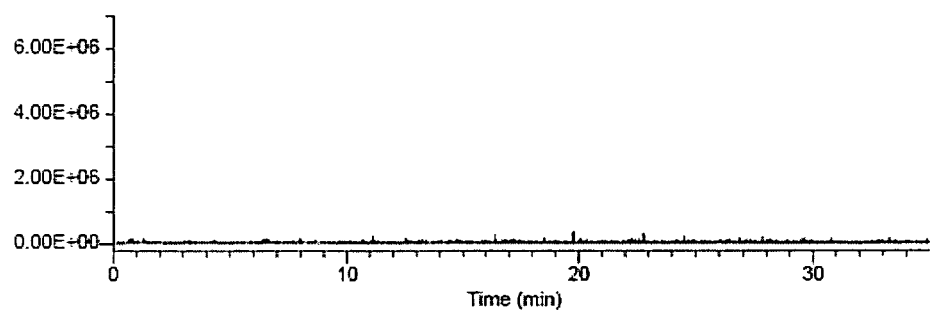
FIG. 31 is an LC-MS diagram of the phospholipids content (extracted ions from total ion chromatogram: m/z 184, 496, 784, 786, and 834) of a rat plasma sample treated using protein precipitation followed by filtration through a SPE cartridge loaded with zirconia-coated silica chromatographic media.

FIG. 28 is an HPLC-MS diagram for the rat plasma sample treated using standard protein precipitation only. FIG. 29 is an HPLC-MS diagram for the protein-precipitated rat plasma sample additionally treated using the SPE cartridge packed with SCX media particles. FIG. 30 is an HPLC-MS diagram for the protein-precipitated rat plasma sample additionally treated using the SPE cartridge packed with ceria-loaded SCX media particles. FIG. 31 is an HPLC-MS diagram for the protein-precipitated rat plasma sample treated using the SPE cartridge packed with zirconia-coated silica SPE media.

The results of the HPLC-MS analysis described above were summarized by comparing the phospholipid content of each treated sample to the phospholipid content of the protein-precipitated sample. The effectiveness of each sample treatment methods was then expressed as a percent of the phospholipids remaining in the protein-precipitated sample, and is summarized in Table 15 below:

TABLE 15

Comparison of Phospholipid Removal from Rat Plasma Samples Using Three Different SPE Phase Media and Protein Precipitation.

| Method of Sample Treatment | Summed m/z area | Phospholipid Removal (% of SPP sample) |
|---|---|---|
| Standard Protein Precipitation (SPP) | 6.04E+11 | 0% |
| SPP + SPE using SCX Media | 2.48E+11 | 58% |
| SPP + SPE using Ce-loaded SCX Media | 2.04E+11 | 66% |
| SPP + SPE using Zirconia-coated Silica Media | 0.00E+00 | 100% |

The results of this experiment determined that the SCX SPE media extracted 58% of the phospholipids from the protein-precipitated rat plasma. The cation exchange functionality of the SCX SPE media created an ionic bond with the zwitterionic polar head group of the phospholipids, resulting in the retention of the phospholipids on the SPE media. Loading the SCX media with ceria slightly improved the performance of the SCX media by boosting the extraction of the phospholipids from the protein-precipitated rat plasma to a level of 66% of the total phospholipids in the plasma. However, the zirconia-coated silica SPE media, with no special loading or other pre-treatment, extracted 100% of the phospholipids from the protein-precipitated rat plasma.

While the invention has been explained in relation to exemplary embodiments, it is to be understood that various modifications thereof will become apparent to those skilled in the art upon reading the description. Therefore, it is to be understood that the invention disclosed herein is intended to cover such modifications as fall within the scope of the appended claims.

What is claimed is:

1. A solid phase extraction (SPE) media for the selective removal of phosphate-containing compounds from a biological composition prior to bioanalytical analysis, the SPE media consisting of:
   a. silica substrate particles; and,
   b. a transition metal oxide selected from the group consisting of zirconia and titania bonded onto the substrate particles;
   wherein the transition metal is bonded onto the substrate through a direct bridging bond with the silica substrate particles, and wherein the SPE media bonds to the phosphate-containing compounds using a Lewis-acid interaction.

2. The SPE media of claim 1, wherein the substrate is selected from the group comprised of porous silica, non-porous silica, and combinations thereof.

3. The SPE media of claim 1, wherein the substrate particles have a particle size ranging between 10 nm and about 1000 μm.

4. The SPE media of claim 1, wherein the substrate particles have a particle size ranging between 5 μm and 70 μm.

5. The SPE media of claim 1, wherein the substrate particles are porous, and the pore size of the substrate particles ranges between 30 Å and 1000 Å.

6. The SPE media of claim 1, wherein the substrate particles are porous, and the pore size of the substrate particles ranges between 60 Å and 400 Å.

7. The SPE media of claim 1, wherein the substrate particles have a surface area ranging between 5 $m^2/g$ and 1000 $m^2/g$.

8. The SPE media of claim 1, wherein the substrate particles have a surface area ranging between 100 $m^2/g$ and 600 $m^2/g$.

9. A solid phase extraction (SPE) media for the selective removal of phosphate-containing compounds from a biological composition prior to bioanalytical analysis, the SPE media consisting of:
   a. porous silica substrate particles with a particle size ranging between 10 nm and 1000 μm, a pore size ranging between 30 Å and 1000 Å, and a surface area ranging between 5 $m^{2/g}$ and 1000 $m^2/g$; and,
   b. zirconia bonded onto the outer surface of the silica substrate particles,
   wherein the zirconia has an electrically neutral charge;
   wherein the zirconia is bonded onto the outer surface of the silica substrate particles through a direct bridging bond with the silica substrate, and wherein the SPE media bonds to the phosphate-containing compounds using a Lewis-acid interaction.

10. The SPE media of claim 9, wherein the substrate particles have a particles size ranging between 5 μm and 70 μm.

11. The SPE media of claim 9, wherein the pore size of the substrate particles ranges between 60 Å and 400 Å.

12. The SPE media of claim 9, wherein the substrate particles have a surface area ranging between 100 $m^2/g$ and 600 $m^2/g$.

* * * * *

UNITED STATES PATENT AND TRADEMARK OFFICE
CERTIFICATE OF CORRECTION

PATENT NO. : 10,928,366 B2
APPLICATION NO. : 12/019445
DATED : February 23, 2021
INVENTOR(S) : Craig Aurund et al.

Page 1 of 1

It is certified that error appears in the above-identified patent and that said Letters Patent is hereby corrected as shown below:

In the Claims

In Column [34], Line [6], in Claim [3] delete "and about 1000" and insert -- and 1000 --

In Column [34], Line [7], in Claim [4] delete "of claim 1" and insert -- of claim 3 --

In Column [34], Line [40], in Claim [10] delete "particles size" and insert -- particle size --

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*